United States Patent
Atarashi

(10) Patent No.: US 6,700,400 B2
(45) Date of Patent: Mar. 2, 2004

(54) CONSTANT DETECTING APPARATUS FOR BRUSHLESS DC MOTOR, CONTROL APPARATUS FOR BRUSHLESS DC MOTOR, AND PROGRAM FOR DETECTING CONSTANT OF BRUSHLESS DC MOTOR

(75) Inventor: Hirofumi Atarashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 100 days.

(21) Appl. No.: 09/995,589

(22) Filed: Nov. 29, 2001

(65) Prior Publication Data

US 2002/0113615 A1 Aug. 22, 2002

(30) Foreign Application Priority Data

Dec. 27, 2000 (JP) ...................... P2000-399405

(51) Int. Cl.[7] .................. G01R 31/34; H02K 23/00; H01R 13/12; G06F 7/64
(52) U.S. Cl. .................. 324/772; 318/254; 318/439; 318/138; 701/66; 701/102
(58) Field of Search .................. 324/772; 318/138, 318/254, 439, 720, 721–724; 701/54–108

(56) References Cited

U.S. PATENT DOCUMENTS

| 4,546,293 A | * | 10/1985 | Peterson et al. ............ 318/254 |
| 4,727,320 A | * | 2/1988 | Brennan ...................... 324/772 |
| 5,352,962 A | * | 10/1994 | Galburt ....................... 318/687 |
| 5,616,994 A | * | 4/1997 | Nagaoka et al. ............ 318/254 |
| 6,538,404 B2 | * | 3/2003 | Kato et al. .................. 318/254 |

* cited by examiner

Primary Examiner—Kamand Cuneo
Assistant Examiner—Emily Y Chan
(74) Attorney, Agent, or Firm—Armstrong, Kratz, Quintos, Hanson & Brooks, LLP

(57) ABSTRACT

A constant detecting apparatus 15 comprising a detecting unit 26 and a calculating unit 27. The detecting unit 26 is structured comprising a rotation sensor 41, a torque sensor 42, a position sensor 43, a rotor temperature sensor 44, a winding temperature sensor 45, a phase voltage detector 46, and phase current detectors 47 and 47. The calculating unit 27 calculates the induced voltage constant Ke that changes depending on the motor temperature Tmag while the motor 11 is being driven based on each of the detected signals from the detecting unit 26, and at the same time, the d axis current Id and the q axis current Iq are calculated after elimination of the iron loss, and the d axis inductance Ld and the q axis inductance Lq in the actual operating state of the motor 11 are calculated.

11 Claims, 9 Drawing Sheets

US 6,700,400 B2

CONSTANT DETECTING APPARATUS FOR BRUSHLESS DC MOTOR, CONTROL APPARATUS FOR BRUSHLESS DC MOTOR, AND PROGRAM FOR DETECTING CONSTANT OF BRUSHLESS DC MOTOR

BACKGROUND OF THE INVENTION

1. Field of the Invention

The present invention relates to a constant detecting apparatus for a brushless DC motor for detecting the inductance of a brushless DC motor comprising a rotor that has a permanent magnet and a stator that generates a rotating magnetic field that causes the rotation of the rotor, a control apparatus for a brushless DC motor, and a program for detecting the constant of a brushless DC motor.

2. Description of the Related Art

Conventionally, vehicles such as electric vehicles and hybrid vehicles are known that have installed a brushless DC motor using a permanent magnet to provide a magnetic field as a power source for vehicle travel.

A control apparatus for this kind of brushless DC motor is known that carries out feedback control such that, for example, a phase current supplied to each phase of a brushless DC motor is measured, and the measured value of the phase current is converted to an orthogonal coordinate system that rotates in synchronism with the rotor. The orthogonal coordinate system comprises, for example, a d axis current and a q axis current on a dq coordinate system where the direction of the flux of the rotor is the d axis (the torque axis) and the direction orthogonal to this d axis is the q axis (the magnetic field axis). In this control apparatus, the feedback control is carried out so that the difference between the command value and the measured value of the current is zero on this dq coordinate system.

Specifically, the d axis voltage command value and the q axis voltage command value on the dq coordinate system are calculated, for example, by a proportional integration (PI) operation from the differences between the command value and the observed value of the current on the dq coordinate axis, that is, the d axis current difference and the q axis current difference. Next, each of the voltage command values for the phase voltage supplied to each of, for example, three phases (the U phase, the V phase, and the W phase) of the brushless DC motor are calculated from the d axis voltage command value and the q axis voltage command value. In addition, each of these voltage command values is input as a switching command to the inverter formed by switching elements such as insulated-gate bipolar transistors (IGBTs), and the alternating current power for driving the brushless DC motor is output from the inverter depending on these switching commands.

In a control apparatus for a brushless DC motor according to the one example of the conventional art described above, a method is known wherein, for example, the d axis inductance and q axis inductance are calculated as parameters when the d axis current command value and the q axis current command value are calculated based on the torque command that depends on how much the driver of the vehicle maneuvers the accelerator.

However, in the control apparatus of the brushless DC motor described above, because of the presence, for example, of the phase delay characteristic of the position sensor for detecting the electromagnetic pole position of the rotor, there is the case in which the signal of the position sensor that represents a predetermined reference position presents a value that has shifted with respect to the true reference position as the number of rotations increases. Due to the shifting of the position sensor, there are the problems that errors occur in the phases of each of the current phases and the phases of each of the voltage phases, and that errors occur in the results of the calculation of the d axis inductance and the q axis inductance.

In addition, while the brushless DC motor is being rotated, the winding resistance value fluctuates along with the fluctuations in the temperature of the windings that are wound around the rotor, the induced voltage fluctuates along with the fluctuations in the temperature of the permanent magnet of the rotor, the iron loss fluctuates, or the like, and thereby there are the problems that errors occur in the voltage vector, and that errors occur in the results of the calculation of the d axis inductance and the q axis inductance.

Here, in the case that the d axis current command value and the q axis current command value are calculated based on a d axis inductance and a q axis inductance that include these errors, there are the problems that the precision of the initial response decreases, and that the responsiveness during feedback control deteriorates. Furthermore, because the actual operating condition cannot be adequately known, there is the concern that inconveniences such as a decrease in the operating efficiency and excess current may occur.

In addition, in methods that estimate each of the inductances by taking into consideration the amount of transient fluctuation of the d axis inductance and the q axis inductance, there are the problems that the amount of required memory must be increased in order to store each type of control data. In addition, the calculation processing becomes complex, the scale of the control apparatus increases, and the necessary cost is increased when the control apparatus is configured.

In consideration of the above-described problems, it is an object of the present invention to provide a constant detecting apparatus for a brushless DC motor wherein the necessary cost originating in configuring the apparatus and the programs is decreased and the initial response precision and readiness during control is increased, control apparatus for the brushless DC motor, and a program for detecting the constant of a brushless DC motor.

SUMMARY OF THE INVENTION

In order to attain the object of solving the above-described problems, in a first aspect of the present invention, a constant detecting apparatus for a brushless DC motor for detecting the inductance of a brushless DC motor comprising a rotor that has a permanent magnet and a multiphase stator that generates a rotating magnetic field that causes the rotation of the rotor is characterized in comprising a phase voltage detecting device (for example, the phase voltage detector 46 in the embodiment described below) for detecting the phase angle and the effective value of the phase voltage of the brushless DC motor and a phase current detecting device (for example, the phase current detector 47 in the embodiment described below) for detecting the phase angle and the effective value of the phase current and a position detecting device (for example, the position sensor 43 in the embodiment described below) for detecting the phase angle of the induced voltage from the magnetic pole position of the rotor and a rotation number detecting device (for example the rotation sensor 41 in the embodiment described below) for detecting the number of rotations; a phase resistance value calculating device (for example, step S 12 in the embodiment described below) for calculating the phase resistance value based on the temperature of the brushless DC motor and an induced voltage constant calculating device (for example, step S 24 in the embodiment described below) for calculating the induced voltage constant; a phase difference calculating device (for example, step S 14 and step S 17 in the embodiment described below) for calculating the voltage phase difference comprising the difference between the phases of the induced voltage and phase voltage and the current phase difference comprising the difference between the phases of the induced voltage and the phase current; a phase compensating value calculating device (for example, the step S 16 in the embodiment described below) for calculating the phase compensating value that compensates the voltage phase difference and the current phase difference based on the number of rotations; an iron loss calculating device (for example, steps S 20 to step S 27 in the embodiment described below) for calculating the iron loss of the brushless DC motor; an effective phase current calculating device (step S 28 in the embodiment described below) for calculating the effective phase current based on the iron loss by subtracting the iron loss component from the phase current; and an inductance calculating device (for example step S 29 in the embodiment described below) for calculating the magnetic field axis inductance and the torque axis inductance based on the phase resistance value, the number of rotations, the induced voltage constant, the voltage phase difference, the current phase difference, the phase compensating value, and the effective phase current.

According to the constant detecting device for a brushless DC motor having the structure described above, the copper loss can be suitably calculated by calculating the phase resistance value that depends on the temperature change of the brushless DC motor while rotating. Furthermore, a suitable induced voltage can be calculated by multiplying the induced voltage constant found by searching a map, for example, and an accurate number of rotations detected by the rotating number detecting device, which depends on the temperature change of the brushless DC motor while rotating.

Furthermore, an increase in the error caused by the phase delay characteristics of the position detecting device can be prevented by compensating the voltage phase error and the current phase error detected by the position detecting device depending on the number of rotations. Furthermore, a suitable phase current can be calculated depending on the actual operating state of the brushless DC motor by calculating the iron loss of the brushless DC motor during rotation and subtracting the iron loss component from the phase current detected by the phase current detecting device.

In this manner, each inductance can be calculated with high precision taking into consideration the fluctuation of the copper loss, the fluctuation of the induced voltage, the detected error due to the phase delay of the position detecting device, and the discrepancy in the phase current due to the iron loss by calculating the magnetic field axis inductance and the torque axis inductance based on the calculated phase resistance value, the induced voltage constant, the voltage phase difference and current phase difference, the phase compensating value, and the effective phase current.

In a second aspect of the present invention, a constant detecting apparatus for a brushless DC motor according to the first aspect comprises an output torque detecting device (for example, the torque sensor 42 in the embodiment described below) for detecting the output torque of the brushless DC motor, and wherein the iron loss calculating device comprises a motor power calculating device (for example, step S 20 in the embodiment described below) for calculating the motor output power and the motor input power of the brushless DC motor based on the output torque and the number of rotations; a copper loss calculating device (for example, step S 21 in the embodiment described below) for calculating the copper loss based on the phase resistance value and the phase current; a total motor loss calculating device (for example, step S 22 of the embodiment described below) calculates the total motor loss by subtracting the motor output power from the motor input power; a mechanical loss calculating device (for example, step S 23 in the embodiment described below) for calculating the mechanical loss of the brushless DC motor; a subtracting device (for example, step S 26 in the embodiment describe below) for calculating the iron loss by subtracting the copper loss and the mechanical loss from the total motor loss; and an equivalent resistance value calculating device (for example, step S 27 in the embodiment described below) for calculating the measured iron loss equivalent resistance value based on the effective value of the phase voltage that includes all frequency components and the iron loss.

According to the constant calculating device of the brushless DC motor having the structure described above, the effective phase current that does not include the iron loss component can be easily calculated from the phase current detected by the phase current detecting device by calculating the iron loss by subtracting the copper loss and the mechanical loss from the total loss of the brushless DC motor, and then calculating the iron loss equivalent resistance value for the phase voltage from this iron loss.

Here, a suitable mechanical loss that depends on the state of actual operating state of the brushless DC motor can be obtained by setting in advance a predetermined map or the like that depends, for example, on the number of rotations.

Furthermore, in a third aspect of the present invention, the constant detecting device for a brushless DC motor is characterized in that the phase resistance value calculating device calculates the phase resistance value based on the temperature of the stator windings, and the induced voltage constant calculating device calculates the induced voltage constant based on the temperature of the rotor.

According to the constant detecting device for a brushless DC motor having the structure described above, in the brushless DC motor during rotation, a phase resistance value that increases along with the increase in the winding temperature can be suitably calculated, and at the same time an induced voltage that changes with a decreasing tendency along with the increase in the temperature of the permanent magnet used to provide the magnetic field can be suitably calculated.

Here, in the case that the induced voltage is calculated, the induced voltage can be easily calculated by setting in advance a predetermined map or the like for the induced voltage constant that changes depending on the temperature of the rotor, and multiplying the induced voltage constant obtained by the map search by the number of rotations.

In addition, in a fourth aspect of the present invention, the constant detecting device for a brushless DC motor comprising a rotor that has a permanent magnet and a multiphase stator that generates a rotating magnetic field that causes the rotation of the rotor, and is rotated by an electric switching device (for example, the inverter 13 in the embodiment described below) is characterized in comprising a phase voltage detecting device (for example, the phase voltage detector 46 in the embodiment described below) for detecting the phase angle and the effective value of the phase voltage of the brushless DC motor and a phase current detecting device (for example, the phase current detector 47 in the embodiment described below) for detecting the phase angle and the effective value of the phase current and a position detecting device (for example, the position sensor 43 in the embodiment described below) for detecting the phase angle of the induced voltage from the magnetic pole position of the rotor and a rotation number detecting device (for example the rotation sensor 41 in the embodiment described below) for detecting the number of rotations; a phase resistance value calculating device (for example, step S 12 in the embodiment described below) for calculating the phase resistance value based on the temperature of the brushless DC motor; a phase difference calculating device (for example, step S 14 and step S 17 in the embodiment described below) for calculating the voltage phase difference that comprises the difference between the phases of the induced voltage and phase voltage and the current phase difference comprising the difference between the phases of the induced voltage and phase current; a phase compensating value calculating device (for example, the step S 16 in the embodiment described below) for calculating the phase compensating value that compensates the voltage phase difference and the current phase difference; an iron loss calculating device (for example, steps S 20 to step S 27 in the embodiment described below) for calculating the iron loss of the brushless DC motor during rotation; an effective phase current calculating device (step S 28 in the embodiment described below) for calculating the effective phase current based on the iron loss by subtracting the iron loss component from the phase current; a power supply interrupting device (for example, the interruption circuit 56 in the embodiment described below) that temporarily interrupts the power supply to the brushless DC motor from the electric switching device; and an inductance calculating device (for example step S 29 in the embodiment described below) for detecting the voltage value of the induced voltage by the phase voltage detecting device during the power supply interruption due to the power supply interruption device, and calculates the magnetic field axis inductance and the torque axis inductance based on the phase resistance value, the voltage value of the induced voltage, the voltage phase difference, the current phase difference, the phase compensating value, and the effective phase current.

According to the constant detecting apparatus for a brushless DC motor having the structure described above, when calculating the magnetic field axis inductance and the torque axis inductance based on the detected signals of each of the detecting device and taking into consideration the fluctuation in the copper loss, the fluctuation in the induced voltage, the detected error due to the phase delay of the position detecting device, and the discrepancy of the phase current due to the iron loss, the induced voltage can be directly detected by the phase voltage detecting device by temporarily interrupting the power supply from the electrical switching device that rotates the brushless DC motor.

Thereby, the magnetic field axis inductance and the torque axis inductance can be calculated with high precision depending on the state of actual operation of the brushless DC motor.

In addition, in a fifth aspect of the present invention, the constant detecting apparatus of the brushless DC motor comprising a rotor that has a permanent magnet and a stator having multiphase stator windings that generate a rotating field that rotates this rotor, and detects the inductance of the brushless DC motor rotated by an electric switching device (for example, the inverter 13 in the embodiment described below) is characterized in comprising a winding temperature detecting device (for example the winding temperature sensor 45 in the embodiment described below) for detecting the temperature of the rotor windings; a rotor temperature detecting device (for example, the rotor temperature sensor 44 in the embodiment described below) for detecting the temperature of the rotor; a phase voltage detecting device (for example, the phase voltage detector 46 in the embodiment described below) for detecting the phase angle and the effective value of the phase voltage; a phase current detecting device (for example, the phase current detector 47 in the embodiment described below) for detecting the phase angle and the effective value of the phase current; a position detecting device (for example, the position sensor 43 in the embodiment described below) for detecting the phase angle of the induced voltage from the magnetic pole position of the rotor; a rotation number detecting device (for example, the rotation sensor 41 in the embodiment described below) for detecting the number of rotations; an output torque detecting device (for example, the torque sensor 42 in the embodiment described below) for detecting the output torque; a phase difference detecting device (for example step S 14 and step S 17 in the embodiment described below) for calculating the voltage phase difference comprising the difference between the phases of the induced voltage and the phase voltage and the current phase difference comprising the difference between the phases of the induced voltage and the phase current; a storage device (for example, memory 28 in the embodiment described below) that stores the winding resistance value of the windings and the wiring resistance value of the connecting wiring of the brushless DC motor at a predetermined temperature, the voltage phase difference set in advance depending on the number of rotations and the mechanical loss that is set in advance depending on the compensated value of the current phase difference and the number of rotations, and the induced voltage constant set in advance depending on the temperature of the rotor; a phase resistance value calculating device (for example, step S 12 in the embodiment described below) for calculating the phase resistance value of the brushless DC motor during rotation based on the winding temperature, the winding resistance value, and the wiring resistance value; a phase difference compensating device (for example, step S 16 to step S 19 in the embodiment described below) for calculating the compensating voltage phase difference and the compensating current phase difference that compensate the current phase difference and the voltage phase difference based on the compensating value; a motor power calculating device (for example, step S 20 in the embodiment described below) for calculating the motor output power and the motor input power of the brushless DC motor based on sad output torque and the number of rotations; a copper loss calculating device (for example, step S 21 in the embodiment described below) for calculating the copper loss based on an effective value that includes the phase resistance value and all frequency components of the phase current; a total motor loss calculating device (for example, step S 22 in the embodiment described below) for calculating the total motor loss by subtracting the motor output power from the motor input power; a subtracting device (for example, step S 26 in the embodiment described below) for calculating the iron loss by subtracting the copper loss and the mechanical loss from the total motor loss; an equivalent resistance value calculating device (for example step S 27 in the embodiment described below) for calculating the measured iron loss equivalent resistance value based on the effective value of the phase voltage that includes all frequency components and the iron loss; an effective phase current calculating device (for example, step S 28 in the embodiment described below) for calculating the effective phase current excluding the iron loss component by subtracting the iron loss component from the effective value of the phase current and an effective phase difference calculating device (for example, step S 28 in the embodiment explained below) for calculating the effective current phase difference excluding the iron core component from the compensating current phase difference based on the magnetic filed axis current value and the torque axis current value of the effective phase current; and an inductance calculating device (for example step S 29 in the embodiment described below) for calculating the magnetic field axis inductance and the torque axis inductance based on the phase resistance value, the number of rotations, the induced voltage constant, the effective phase current, the compensating voltage phase difference, and the effective current phase difference.

According to the constant detecting apparatus for a brushless DC motor having the structure described above, the winding resistance value after temperature compensation can be calculated based on the winding resistance value at a predetermined temperature stored in the storage device and the winding temperature detected during rotation of the brushless DC motor. In addition, the phase resistance value is calculated by adding the calculated winding resistance value and the wiring resistance value stored in the storage device, and the copper loss is calculated by the phase current detected by the phase current detecting device. In addition, the phase resistance value is calculated by adding the calculated winding resistance value and the wiring resistance value stored in the storage device, and calculates the copper loss by the phase current detected by the phase current detecting device. The effective phase current that does not include the iron loss component by calculating the iron loss based on this copper loss and the mechanical loss and the total motor loss stored in the storage device, and then calculating the iron loss equivalent resistance value with respect to the phase voltage.

In addition, using the compensating values of the phases of voltage phase difference and the current phase difference stored in the storage device, the phase differences detected by the phase detecting device are compensated, and then the current phase difference that does not include the iron loss component is calculated. In addition, by calculating the magnetic field axis inductance and the torque axis inductance based on the induced voltage constant stored in the storage device and the phase resistance value, the effective phase current, the compensating voltage phase difference, and the current phase difference calculated based on the detected values, each of the inductances can be calculated with high precision taking into consideration the fluctuations in the copper loss, the discrepancy of the phase current due to iron loss, the detection error due to the phase delay of the position detecting device, and the fluctuations in the induced voltage.

In addition, in a sixth aspect of the present invention, a control apparatus for a brushless DC motor that rotates a brushless DC motor comprising a rotor that has a permanent magnet and a multiphase stator having stator windings that generate a rotating field that rotates this rotor using an electric switching device (for example, the inverter 13 in the embodiment described below) that sequentially commutes the electricity to the stator winding that comprises a plurality of switching elements characterized in comprising a phase voltage detecting device (for example, the phase voltage detector 46 in the embodiment described below) for detecting the phase angle and the effective value of the phase voltage of the brushless DC motor and a phase current detecting device (for example, the phase current detector 47 in the embodiment described below) for detecting the phase angle and the effective value of the phase current and a position detecting device (for example, the position sensor 43 in the embodiment described below) for detecting the phase angle of the induced voltage from the magnetic pole position of the rotor and a rotation number detecting device (for example the rotation sensor 41 in the embodiment described below) for detecting the number of rotations; a phase resistance value calculating device (for example, step S 12 in the embodiment described below) for calculating the phase resistance value based on the temperature of the brushless DC motor and an induced voltage constant calculating device (for example, step S 24 in the embodiment described below) for calculating the induced voltage constant; a phase difference calculating device (for example, step S 14 and step S 17 in the embodiment described below) for calculating the voltage phase difference comprising the difference between the phases of the induced voltage and the phase current and the current phase difference comprising the difference between the phases of the induced voltage and phase current; a phase compensating value calculating device (for example, the step S 16 in the embodiment described below) for calculating the phase compensating value that compensates the voltage phase difference and the current phase difference based on the number of rotations; an iron loss calculating device (for example, steps S 20 to step S 27 in the embodiment described below) for calculating the iron loss of the brushless DC motor during rotation; an effective phase current calculating device (step S 28 in the embodiment described below) for calculating the effective phase current based on the iron loss by subtracting the iron loss component from the phase current; an inductance calculating device (for example step S 29 in the embodiment described below) for calculating the magnetic field axis inductance and the torque axis inductance based on the phase resistance value, the number of rotations, the induced voltage constant, the voltage phase difference, the current phase difference, the phase compensating value, and the effective phase current; a torque command input device (for example, the torque command calculating unit 21 in the embodiment described below) that inputs the torque command value; a current command value calculating device (for example, the target current calculating unit 22 in the embodiment described below) for calculating the magnetic field axis current command value and the torque axis current command value based on the induced voltage constant, the magnetic field axis inductance, the torque axis inductance, and the torque command value; and a pulse width modulated signal output device (for example, the feedback control unit 23 in the embodiment described below) that outputs a pulse width modulated signal to the electric switching device based on the magnetic field axis current command value and the torque axis current command value.

According to control apparatus for the brushless DC motor having the structure described above, a suitable copper loss can be suitably calculated by calculating the phase resistance value that depends on the temperature change of the brushless DC motor during rotation. Furthermore, a suitable induced voltage that depends on the temperature change of the brushless DC motor during rotation can be calculated by multiplying the induced voltage constant found, for example, by searching a map, and the number of rotations detected by a rotation detecting device.

Furthermore, the increase in the error caused by the phase delay property of the position detecting device can be prevented by compensating the voltage phase difference and the current phase difference detected by the position detecting device depending on the number of rotations. Furthermore, a suitable phase current can be calculated that depends on the actual operating state of the brushless DC motor by calculating the iron loss of the brushless DC motor during rotation and subtracting the iron loss component from the phase current detected by the phase current detecting device.

Each inductance can be calculated with high precision taking into consideration the fluctuation of the copper loss, the fluctuation in the induced voltage, the detected difference due to the phase delay of the position detecting device, and the discrepancy in the phase current due to the iron loss by calculating the magnetic field axis inductance and the torque axis inductance based on the phase resistance value, induced voltage, the voltage phase difference and the current phase difference, the phase compensating value, and the effective phase current.

Thereby, during the control of the brushless DC motor, the correct magnetic field axis current command value and the torque axis current command value that depend on the torque command value can be calculated, and the initial response precision can be improved. Furthermore, feedback control can be carried out based on the effective phase current that does not include the iron loss component, and the responsiveness and operational effectiveness during control can be improved.

Furthermore, because the calculation processing is carried out using many detected valued that have been measured by each of the detecting devices, for example, it is possible to prevent increasing the amount of memory required to store the control data and prevent increasing the scale of the control apparatus due to the increasing complexity of the calculating processing, and thereby contribute to the elimination of the costs required when constructing the control apparatus.

In addition, in a seventh aspect of the present invention, a control apparatus for a brushless DC motor is characterized in comprising an output torque detecting device (for example, the torque sensor 42 in the embodiment described below) for detecting the output torque of the brushless DC motor, and wherein the iron loss calculating device comprises a motor power calculating device (for example, step S 20 in the embodiment described below) for calculating the motor output power and the motor input power of the brushless DC motor based on the output torque and the number of rotations; a copper loss calculating device (for example, step S 21 in the embodiment described below) for calculating the copper loss based on the phase resistance value and the phase current; a total motor loss calculating device (for example, step S 22 in the embodiment described below) for calculating the total motor loss by subtracting the motor output power from the motor input power; a mechanical loss calculating device (for example step S 23 in the embodiment described below) for calculating the mechanical loss of the brushless DC motor; a subtracting device (for example, step 26 in the embodiment described below) for calculating the iron loss by subtracting the copper loss and the mechanical loss from the total motor loss; and an equivalent resistance value calculating device (for example, step S 27 in the embodiment described below) for calculating the measured iron loss equivalent resistance value based on the effective value of the phase voltage that include all frequency components and the iron loss.

According to the control apparatus for the brushless DC motor having the structure described above, the effective phase current that does not include the iron loss component for the phase current detected by the phase current detecting device can be easily calculated by calculating the iron loss by subtracting the copper loss and the mechanical loss from the total loss of the brushless DC motor and calculating the iron loss equivalent resistance value for the phase voltage from this iron loss.

Here, a suitable mechanical loss that depends on the actual operating state of the brushless DC motor can be obtained by setting in advance a predetermined map or the like that depends, for example, the number of rotations.

Furthermore, in an eighth aspect of the present invention, a control apparatus for a brushless DC motor is characterized that the phase resistance value calculating device calculates the phase resistance value based on the temperature of the stator windings, and the induced voltage constant calculating device calculates the induced voltage constant based on the temperature of the rotor.

According to the control apparatus of the brushless DC motor having the structure described above, while the brushless DC motor is rotating, the phase resistance value that increases along with the increase in the winding temperature can be suitably calculated, and in addition, an induced voltage that decreases along with the increase on the temperature of the permanent magnet used for the magnetic field can be suitably calculated.

Here, in the case that the induced voltage is calculated, the induced voltage can be easily calculated by setting in advance a predetermined map or the like for the induced voltage constant that changes depending, for example, on the temperature of the rotor, and multiplying the number of rotations by the induced voltage constant obtained by a map search.

Furthermore, in a ninth aspect of the present invention, a control apparatus for a brushless DC motor that rotates a brushless DC motor comprising a rotor that has a permanent magnet and a multiphase stator having stator windings that generate a rotating field that rotates this rotor using an electric switching device (for example, the inverter 13 in the embodiment described below) that sequentially commutes the electricity to the stator winding that comprises a plurality of switching elements characterized in comprising a phase voltage detecting device (for example, the phase voltage detector 46 in the embodiment described below) for detecting the phase angle and the effective value of the phase voltage of the brushless DC motor and a phase current detecting device (for example, the phase current detector 47 in the embodiment described below) for detecting the phase angle and the effective value of the phase current and a position detecting device (for example, the position sensor 43 in the embodiment described below) for detecting the phase angle of the induced voltage from the magnetic pole position of the rotor and a rotation number detecting device (for example the rotation sensor 41 in the embodiment described below) for detecting the number of rotations; a phase resistance value calculating device (for example, step S 12 in the embodiment described below) for calculating the phase resistance value based on the temperature of the brushless DC motor; a phase compensating value calculating device (for example, the step S 16 in the embodiment described below) for calculating the phase compensating value that compensates the voltage phase difference and the current phase difference; an iron loss calculating device (for example, steps S 20 to step S 27 in the embodiment described below) for calculating the iron loss of the brushless DC motor during rotation; an effective phase current calculating device (for example, step S 28 in the embodiment described below) for calculating the effective phase current by subtracting the iron loss component from the phase current based on the iron loss; a power supply interrupting device (for example, the interrupting circuit 56 in the embodiment described below) that temporarily interrupts the power source from the electric switching device to the brushless DC motor; an inductance calculating device (for example step S 29 in the embodiment described below) for detecting the voltage value of the induced voltage by the phase voltage detecting device during the power supply interruption by the power supply interrupting device, and calculates the magnetic field axis inductance and the torque axis inductance based on the phase resistance value, the voltage value of the induced voltage, the voltage phase difference, the current phase difference, the phase compensating value, and the effective phase current; a torque command input device (for example, the torque command calculating unit 21 in the embodiment described below) that inputs the torque command value; a current command value calculating device (for example, the target current calculating unit 22) for calculating the magnetic field axis current command value and the torque axis current command value based on the induced voltage, the magnetic field axis inductance, the torque axis inductance, and the torque command value; and a pulse width modulated signal output device (for example, the feedback control unit 23 in the embodiment described below) that outputs a pulse width modulated signal to the electric switching device based on the magnetic field axis current command value and the torque axis current command value.

According to the control apparatus for the brushless DC motor having the structure described above, the induced voltage can be directly detected by phase voltage detecting device, and at the same time, the actual rotation angle can be directly detected by the rotation angle detecting device by temporarily interrupting the power supply from the electric switching device that rotates the brushless DC motor when calculating the magnetic field axis inductance and torque axis inductance that takes into consideration the fluctuation in the copper loss, the fluctuation of induced voltage, and detection error due to the phase delay of the rotation angle detecting device, and the discrepancy in the phase voltage due to the iron loss based on detected signals from each of the detecting device.

Thereby, a magnetic field axis inductance and the torque axis inductance can be calculated with high precision that depends on the actual operational state of the brushless DC motor.

Furthermore, in a tenth aspect of the present invention, a control apparatus for a brushless DC motor that rotates a brushless DC motor comprising a rotor that has a permanent magnet and a multiphase stator having stator windings that generate a rotating field that rotates this rotor using an electric switching device (for example, the inverter 13 in the embodiment described below) that comprises a plurality of switching elements and sequentially commutes the electricity to the stator winding, comprises in order to detect the rotating brushless CD motor by said electric switching device a winding temperature detecting device (for example the winding temperature sensor 45 in the embodiment described below) for detecting the temperature of the stator winding by the electric switching device and a rotor temperature detecting device (for example, the rotor temperature sensor 44 in the embodiment described below) for detecting the temperature of the rotor and a phase voltage detecting device (for example, the phase voltage detector 46 in the embodiment described below) for detecting the phase angle and the effective value of the phase voltage and a phase current detecting device (for example, the phase current detector 47 in the embodiment described below) for detecting the phase angle and the effective value of the phase current and a position detecting device (for example, the position sensor 43 in the embodiment described below) for detecting the phase angle of the induced voltage from the magnetic pole position of the rotor and a rotation number detecting device (for example the rotation sensor 41 in the embodiment described below) for detecting the number of rotations and an output torque detecting device (for example, the torque sensor 42 in the embodiment described below) for detecting the output torque; and further comprises: a phase difference calculating device (for example, step S 14 and step S 17 in the embodiment described below) for calculating the voltage phase difference comprising the difference between the phases of the induced voltage and phase voltage and the current phase difference comprising the differences in the phases of the induced voltage and the phase current; a memory device (for example the memory 28 in the embodiment described below) that stores the winding resistance value of the winding and the wiring resistance value of the connecting wiring of the brushless DC motor at a predetermined temperature, the pre-set voltage phase difference and the compensated value of the current phase differences that depend on the number of rotations, the preset mechanical loss that depends on the number of rotations, and a preset induced voltage constant that depends on the temperature of the rotor; a phase resistance value calculating device (for example, step S 12 in the embodiment described below) for calculating the phase resistance value of the brushless DC motor during rotation based on the winding temperature, the winding resistance value, and the wiring resistance value; a phase difference compensating device (for example, the step S 16 to step S 19 in the embodiment described below) for calculating the compensating voltage phase difference and the compensating current phase difference that compensate the current phase difference and the voltage phase difference based on the compensating value; a motor power calculating device (for example, step S 20 in the embodiment described below) for calculating the motor output power and the motor input power for the brushless DC motor based on the output torque and the number of rotations; a copper loss calculating device (for example, step 21 in the embodiment described below) for calculating the copper loss based on the phase resistance value and effective value that includes all frequency components of the phase current; a total motor loss calculating device (for example, step 22 in the embodiment described below) calculates the total motor loss by subtracting the motor output power from the motor input power; a subtracting device (for example, step S 26 in the embodiment described below) for calculating the iron loss by subtracting the copper loss and the mechanical loss from the total motor loss; an equivalent resistance value calculating device (for example, step S 27 in the embodiment described below) for calculating the measured iron loss equivalent resistance value based on the effective value of the phase voltage that includes all frequency components and the iron loss; an effective phase current calculating device (for example, step 28 in the embodiment described below) for calculating the effective phase current eliminating the iron core component by subtracting the iron loss from the effective value of the phase current based on the measured iron loss equivalent resistance value, and the compensating current phase difference; an effective phase difference calculating device (for example, also step S 28 in the embodiment described below) for calculating the effective current phase difference eliminating the iron loss components from the compensating current phase difference based on the magnetic field axis current value and the torque axis current of the effective phase current; an inductance calculating device (for example, step S 29 in the embodiment described below) for calculating the magnetic field axis inductance and the torque axis inductance based on the phase resistance value, the number of rotations, the induced voltage constant, the effective phase current, the compensating voltage phase difference, and the effective current phase difference; a torque command input device (for example, the torque command calculating unit 21) that inputs the torque command value; a current command value calculating device (for example, the target current calculating unit 22 in the embodiment described below) for calculating the magnetic field axis current command value and the torque axis current command value based on the induced voltage constant, the magnetic field axis inductance, the torque axis inductance, and the torque command value; and a pulse width modulated signal output device (for example, the feedback control unit 23 in the embodiment described below) that outputs a pulse width modulated signal to the electric switching device based on the magnetic field axis current command value and the torque axis current command value.

According to the control apparatus for the brushless DC motor having the structure described above, the winding resistance value after temperature compensation can be calculated based on the winding resistance value at a predetermined temperature stored in the storage device and the winding temperature detecting during rotation of the brushless DC motor. In addition, the phase resistance value is calculated by adding the calculated winding resistance value and the wiring resistance value stored in the storage device and the copper loss is calculated by the phase current detected by the phase current detecting device. The iron loss is calculated based on this copper loss, the mechanical loss stored in the storage device, and the total motor loss. Then the effective phase current that does not include the iron loss component is calculated by calculating the iron loss equivalent resistance value for the phase voltage.

In addition, the detected voltage phase difference and current phase difference are compensated by the compensating value of the phase stored in the storage device, and then the current phase difference that does not include the iron loss component is calculated.

In addition, each of the inductances can be calculated with high precision taking into consideration the fluctuation in the copper loss, the discrepancy in the phase current due to the iron loss, the detected error due to the phase delay of the position detecting device and the fluctuation in the induced voltage by calculating the induced voltage constant and the magnetic field axis inductance and the torque axis inductance based on the phase resistance value, the effective phase current, the compensating voltage phase difference, and the current phase difference.

Thereby, during control of the brushless DC motor, the correct magnetic field axis current command value and the torque axis current command value that depend on the torque command value can be calculated, and the initial response precision can be improved. Furthermore, feedback control can be carried out based on the effective phase current that does not include an iron loss component, and the responsiveness and operational efficiency during control can be improved.

In addition, in an eleventh aspect of the present invention, a constant detecting program for a brushless DC motor for making a computer function as a device for calculating the inductance of a brushless DC motor during rotation is characterized in comprising a phase resistance value calculating device (for example, step S 12 in the embodiment described below) for calculating the phase resistance value, based on the temperature of the brushless motor and an induced voltage constant calculating device (for example, step S 24 in the embodiment described below) for calculating the induced voltage constant; a phase difference calculating device (for example, step S 14 and step S 17 in the embodiment described below) for calculating the voltage phase difference comprising the difference between the phases of the induced voltage and the phase voltage and the current phase difference comprising the difference between the phases of the induced voltage and phase current; a phase compensating value calculating device (for example, the step S 16 in the embodiment described below) for calculating the phase compensating value that compensates the voltage phase difference and the current phase difference based on the number of rotations of the brushless DC motor; an iron loss calculating device (for example, steps S 20 to step S 27 in the embodiment described below) for calculating the iron loss of the brushless DC motor; an effective phase current calculating device (for example, step S 28 in the embodiment described below) for calculating the current value of the effective phase current by subtracting the iron loss component from the phase current of the brushless DC motor based on the iron loss; and an inductance calculating device (for example step S 29 in the embodiment described below) for calculating the magnetic field axis inductance and the torque axis inductance based on the phase resistance value, the number of rotations, the induced voltage constant, the voltage phase difference, the current phase difference, the phase compensating value, and the effective phase current.

According to the program for detecting the constant of the brushless DC motor having the structure described above, the copper loss can be suitably calculated by calculating the phase resistance value that depends on the temperature change of the brushless DC motor during rotation. Furthermore, a suitable induced voltage can be calculated by multiplying the induced voltage constant that depends on the temperature change of the brushless DC motor during rotation, for example, by searching a map, by the number of rotations detected by the rotation number detecting device.

Furthermore, an increase in the error caused by the phase delay characteristics of the position detecting device can be prevented by compensating the voltage phase difference and the current phase difference detected by the position detecting device depending on the number of rotations. Furthermore, a suitable phase current that depends on the actual operating state of the brushless DC motor can be calculated by calculating the iron loss of the brushless DC motor during rotation and subtracting the iron loss component from the phase current detected by the phase current detecting device.

Each of the inductances can be calculated with high precision taking into consideration the fluctuation of the copper loss, the fluctuation of the induced voltage, the detection error due to the phase delay of the position detecting device, and the discrepancy of the phase current due to the iron loss by calculating the magnetic field axis inductance and the torque axis inductance based on the phase resistance value, the induced voltage constant, the phase compensating value, and the effective phase current calculated in this manner.

In addition, in a twelfth aspect of the present invention, a program for detecting the constant of a brushless DC motor that causes a computer to function as a device for calculating the inductance of a brushless DC motor during rotation characterized in that the program comprises a operating data reading device (for example, step S 16, step S 23, and step S 24 in the embodiment described below) that reads as operating data the temperature of the stator windings and the temperature of the rotor of the brushless DC motor, the phase angle and the effective value of the phase voltage, the phase angle and effective value of the phase current, the voltage phase difference comprising the difference between the phases of the induced voltage and the phase voltage, the current phase difference comprising the difference between the phases of the induced voltage and the phase current, the number of rotations, the output torque, the winding resistance value of the winding and the wiring resistance value of the connection wiring of the brushless DC motor at a predetermined temperature, the compensating value for the voltage phase difference and the current phase difference that has been set in advance depending on the number of rotations and the mechanical loss that has been set in advance depending on the number of rotations, and the phase angle of the induced voltage constant and the induced voltage that has been set in advance depending on the temperature of the rotor; a phase resistance value calculating device (for example, step S 12 in the embodiment described below) for calculating the phase resistance value of the brushless DC motor during rotation based on the winding temperature, the winding resistance value, and the wiring resistance value; a phase difference calculating device (for example, step S 14 and step S 17 in the embodiment described below) for calculating the voltage phase difference and the current phase difference; the phase difference compensating device (for example, step S 16 to step S 19 in the embodiment described below) for calculating the compensating voltage phase difference and the compensating current phase difference that compensate the current phase difference and the voltage phase difference based on the compensating value; a motor out calculating device (for example, step S 20 in the embodiment described below) for calculating the motor output power and motor input power of the brushless DC motor based on the output torque and the number of rotations; a copper loss calculating device (for example, step S 21 in the embodiment described below) for calculating the copper loss based on the phase resistance value and the effective value of the phase current that includes all frequency components; a total motor loss calculating device (for example, step S 22 in the embodiment described below) for calculating the total motor loss by subtracting the motor output power from the motor input power; a subtracting device (for example step S 26 in the embodiment described below) for calculating the iron loss by subtracting the copper loss and the mechanical loss from the total motor loss; an equivalent resistance value calculating device (for example step S 27 in the embodiment described below) for calculating the measured iron loss equivalent resistance value based on the effective value of the phase voltage that includes all frequency components and the measured iron loss; an effective phase calculating device (for example, step S 28 in the embodiment described below) for calculating the current value of the effective phase current eliminating the iron loss component by subtracting the iron loss component from the effective value of the phase current based on the measured iron loss equivalent resistance value and the compensating current phase difference and an effective phase difference calculating device (for example, step S 28 in the embodiment described below) for calculating the effective current phase difference eliminating the iron loss component from the compensating current phase difference based on the magnetic field axis current value and the torque axis current value of said effective phase current; and an inductance calculating device (for example, step S 29 in the embodiment described below) for calculating the magnetic field axis inductance and the torque axis inductance based on the phase resistance value, the number or rotations, the inductance voltage constant, the effective phase current, the compensating voltage phase difference, and the effective current phase difference.

According to the program for detecting the constant of a brushless DC motor having the structure described above, the winding resistance value after temperature compensation can be calculated based on the winding resistance value at a certain temperature and the winding temperature that are read out by the operating data reading device. In addition, the phase resistance value is calculated by adding the calculated winding resistance value and the wiring resistance value, and then the copper loss is calculated from the phase voltage. The iron loss is calculated based on this copper loss, the mechanical loss, and the total motor loss, and then the effective phase current that does not include the iron loss component is calculated by calculating the iron loss equivalent resistance value for the phase voltage.

In addition, the voltage phase difference and the current phase difference are compensated by the compensating value of the voltage phase difference and the current phase difference read out from the operating data reading device, and then the effective phase difference that does not include the iron loss component is calculated.

In addition, each of the inductances can be calculated with high precision taking into consideration the fluctuation of the copper loss, the discrepancy in the phase current due to the iron loss, and the detected error due to the phase delay of the position detecting device by calculating the magnetic field axis inductance and the torque axis inductance based on the induced voltage constant read out by the operating data reading device, the phase resistance value, the effective phase current, and the effective phase difference.

DETAILED DESCRIPTION OF THE INVENTION

Figure 1:
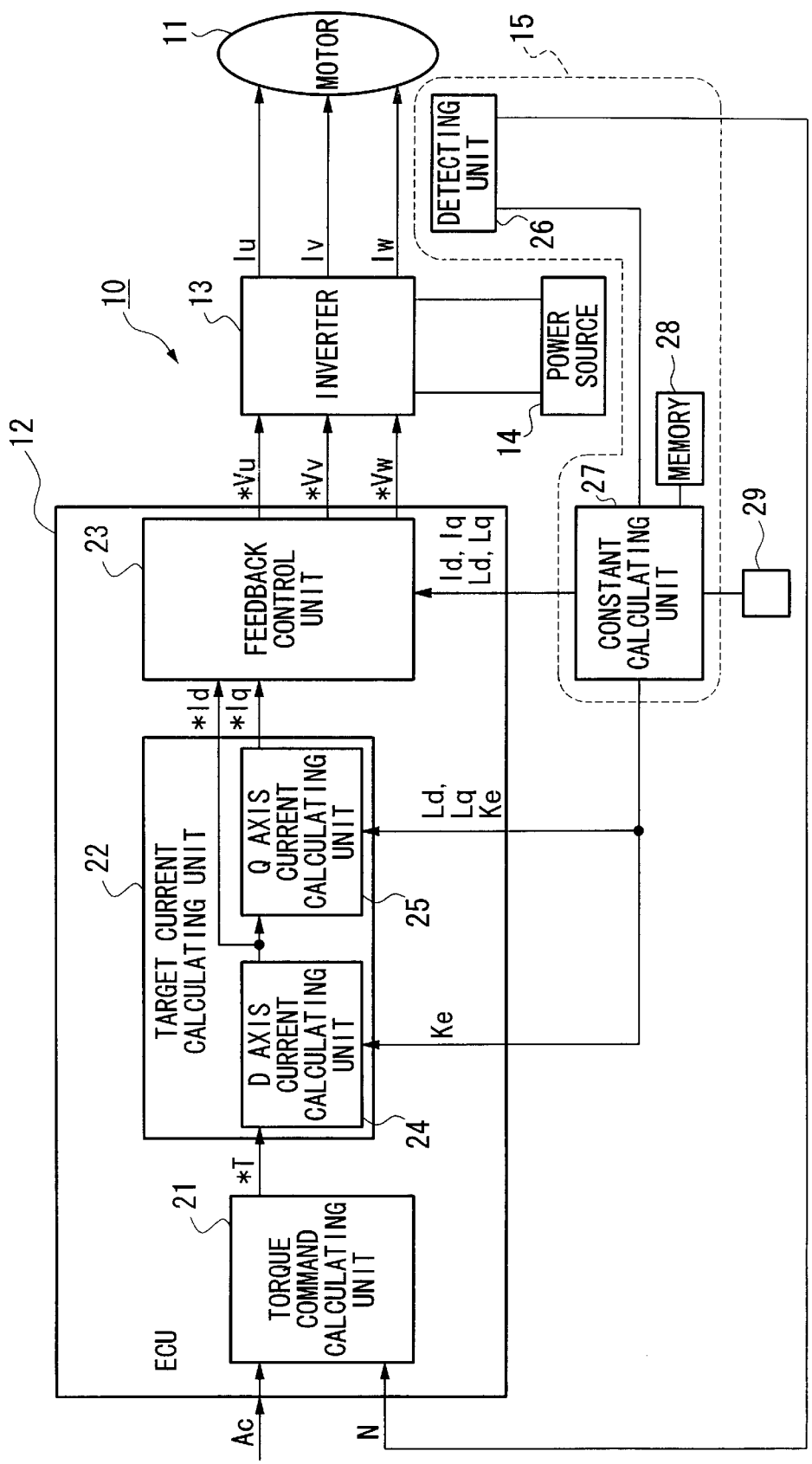
FIG. 1 is a structural diagram of the control apparatus of the brushless DC motor according to the embodiment of the present invention.
Figure 2:
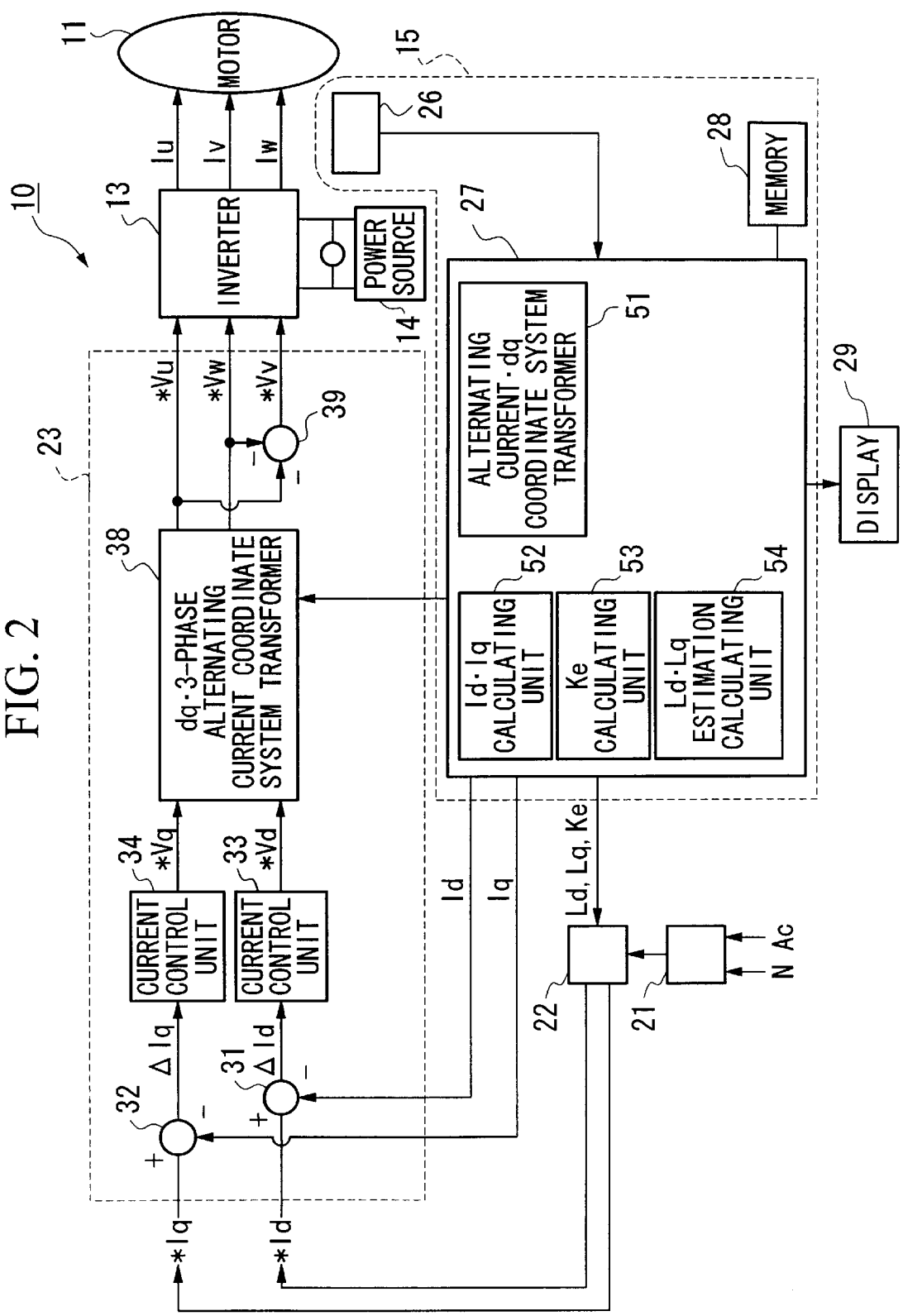
FIG. 2 is a structural diagram showing the concrete structure of the feedback control unit and the constant calculating unit shown in FIG. 1.
Figure 3:
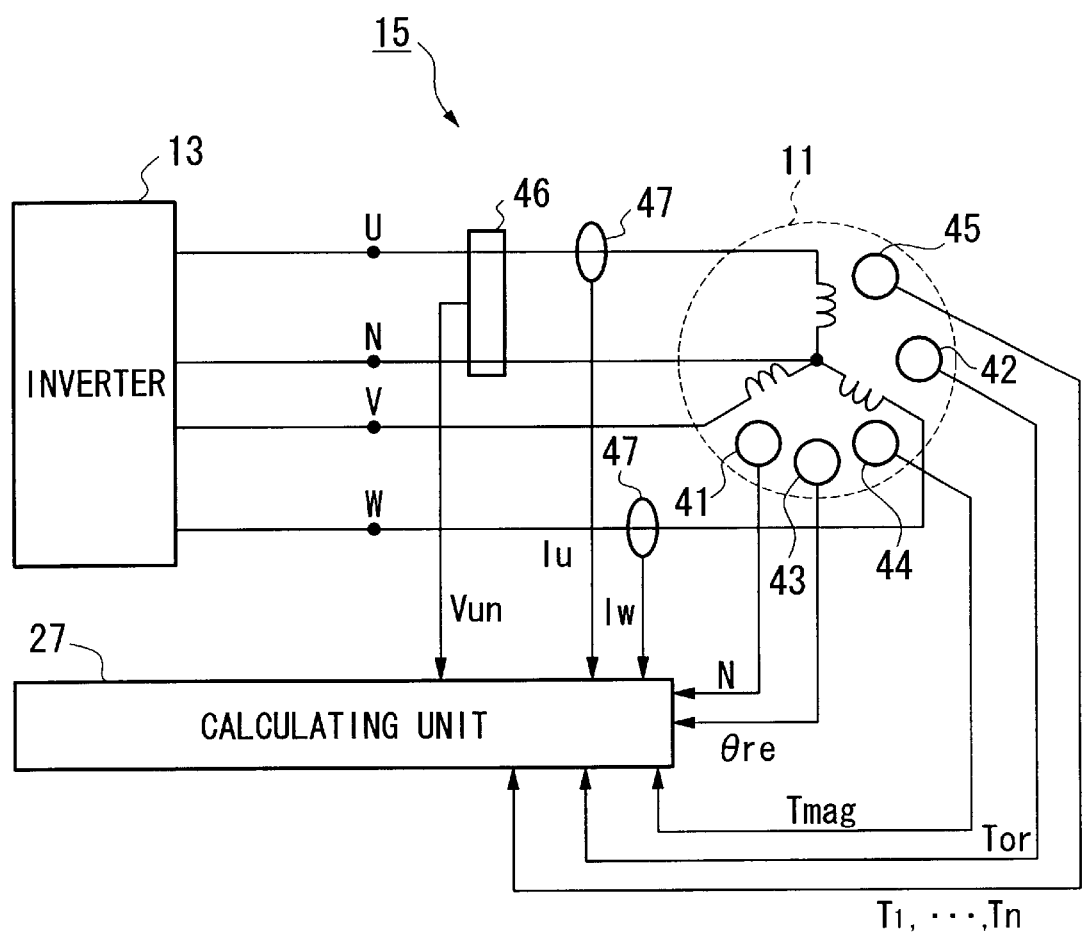
FIG. 3 is a structural diagram showing the concrete structure of the detecting unit of the constant detecting apparatus of the brushless DC motor shown in FIG. 1.

Below, an embodiment of a control apparatus for a brushless DC motor of the present invention will be explained while referring to the drawings. FIG. 1 is a structural drawing of the control apparatus 10 for the brushless DC motor according to an embodiment of the present invention, FIG. 2 is a structural drawing showing the concrete structure of the feedback control unit 23 and the constant calculating unit 27 shown in FIG. 1, and FIG. 3 is a structural drawing showing the concrete structure of the detecting unit 26 of the constant detecting apparatus 15 for the brushless DC motor shown in FIG. 1.

The control apparatus 10 for the brushless DC motor 10 (below, referred to as the "motor control apparatus 10") according to the present embodiment drives and controls the brushless DC motor 11 (below, referred to as the "motor 11") mounted, for example, an electric vehicle or a hybrid vehicle, and this motor 11 is structured comprising a rotor (not illustrated) having a permanent magnet that comprises a magnetic field and a stator (not illustrated) that generates a rotating magnetic field that rotates this rotor.

As shown in FIG. 1, this motor control apparatus 10 is structured comprising, for example, an ECU (electric control unit) 12, an inverter 13, a power source 14, and a constant detecting apparatus 15 for a brushless DC motor (below, referred to as the "constant detecting apparatus 15").

The inverter 13, which is an electrical switching device, acts as, for example, a PWM inverter using pulse-width modulation, and is structured from a bridged switching circuit using a plurality of switching elements, such as an IGBT. In addition, the inverter 13 converts a direct current supplied form a power source 14 comprising a batter, fuel cell, or the like, to a 3-phase alternating current, and supplied it to the motor 11.

Specifically, the conduction of the current to the windings of the stator of the motor 11 is commutated in sequence.

The ECU 12 controls the power converting operation of the inverter 13, and the U-phase AC voltage command value * Vu, the V-phase AC voltage command value * Vv, and the W-phase AC voltage command value * Vw are input as switching commands. The U-phase current Iu, the V-phase current Iv, and the W-phase current Iw are output from the inverter 13 to each phase of the motor 11 depending on each of the voltage command values and Vu, Vv, and Vw.

Thus, the ECU 12 is structured comprising a torque command calculating unit 21, a target current calculating unit 22, and a feedback control unit 23.

The torque command calculating unit 21 calculates the necessary torque value based, for example, on the accelerator manipulation amount Ac and the number N of rotations related to the driver's pressing on the accelerator or the like, and this torque value is output to the target current calculating unit 22 after generating the torque command * T generated by the motor 11.

The target current calculating unit 22 calculates the current command for designating each of the phase currents Iu, Iv, and Iw supplied to the motor 11 from the inverter 13 based on the torque command value * T, and this current command is output to the feedback control unit 23 as the d axis target current * Id and the q axis target current * Iq on the rotating orthogonal coordinate system.

In the dq coordinate system that serves as this rotating orthogonal coordinate system, the direction of the flux of the rotor is the d axis (torque axis) and the direction orthogonal to this d axis is the q axis (magnetic field axis), and the dq coordinate system rotates at an electrical angular velocity core in synchronism with the rotor (not illustrated) of the motor 11. Thereby, the d axis target current * Id and the q axis target current * Iq, which are direct current signals, are sent as current commands for the ac signal supplied to each phase of the motor 11 from the inverter 13.

Here, the target current calculating unit 22 is structured comprising a d axis current calculating unit 24 and a q axis current calculating unit 25.

As shown in the following equation 1, the d axis current calculating unit 24 calculates the d axis target current * Id based on the torque command * T and the induced voltage constant Ke that is described below.

As shown in the following equation 2, the q axis current calculating unit 25 calculates the q axis target current * Iq based on the torque command * T, the induced voltage constant Ke that is described below, the d axis inductance Ld, and the q inductance Lq.

$$*Id = \frac{*T}{Ke} \qquad \text{Equation 1}$$

$$*Iq = \frac{-Ke + \sqrt{Ke^2 + 4 \cdot (Ld - Lq)^2 \cdot (*Id)^2}}{2 \cdot (Ld - Lq)} \qquad \text{Equation 2}$$

The feedback control unit 23 carries out the feedback control of the current on the dq coordinate system, calculates each of the voltage command values * Vu, * Vv, and * Vw based on the d axis target current * Id and the q axis of the target current * Iq, inputs the pulse width modulated signal to the inverter 13, and at the same time carries out control such that both the difference between the d axis current Id and the q axis current Iq (which are obtained by transforming onto the dq coordinate system each of the currents Iu, Iv, and Iw supplied to the motor 11 from the inverter 13) and the difference between the d axis target current * Id and the q axis target current * Iq become zero.

Thereby, the signals of the d axis current Id and the q axis current Iq output from the constant detecting apparatus 15 and the d axis inductance Ld and the q axis inductance Lq and the like are input into the feedback control unit 23.

The constant detecting apparatus 15 is structured comprising a detecting unit 26 and a calculating unit 27, and inputs the detected signal of the number N of the rotations of the motor 11 output from the detecting unit 26 provided in the motor 11, a detected signal of the motor torque Tor output from the motor 11, the detected signal of the magnetic pole position θre (electric angle) of the motor 11, the detected signal of the motor temperature Tmag, that is, the temperature of the rotor (not illustrated) of the motor 11, the detected signal of the winding temperatures T1, ..., Tn, that is, the temperatures at a plurality of locations on the windings of the stator (not illustrated) of the motor 11, the detected signal of the phase voltages (for example, the U phase voltage Vun between the U phase output point U and the neutral point N between each of the phase output points of the inverter 13) supplied to each phase of the motor 11, the detected signal of the phase current (for example, the U phase current Iu and the W phase current Iw) supplied to each of the phases of the motor 11, and the detected signal of the power source voltage Vdc output from the power source 14.

In addition, as will be described below, a predetermined compensating processing is carried out based on each of the types of the detected signals output from the detecting unit 26, and the d axis current Id and the q axis current Iq, the induced voltage constant Ke, and the d axis inductance Ld and the q axis inductance Lq are calculated.

Moreover, the operational timing of the constant detecting apparatus 15 is not limited in particular, but preferably is set so as to operate at a timing that exceeds normal operational timing of the motor 11 or a predetermined number of rotations.

Below, the feedback control unit 23 will be explained referring to FIG. 2.

The d axis current Id and the q axis current Iq output from the constant detecting apparatus 15 are respectively input into the subtractors 31 and 32.

In addition, the subtractor 31 calculates the difference ΔId between d axis target current * Id and the d axis current Id, and the subtractor 32 calculates the difference ΔIq between the q axis target current * Iq and the q axis current Iq.

In this case, because the d axis target current * Id and the q axis target current Iq, and the d axis current Id and the q axis current Iq are direct current signals, the phase delay and the oscillation error and the like are detected as a direct current part.

The difference ΔId and the difference ΔIq output from each of the subtractors 31 and 32 are input respectively into the current control units 33 and 34.

In addition, the current control unit 33 calculates the d axis voltage command value * Vd by control that amplifies the difference ΔId by a PI (proportional integration) operation or the like, and the current control unit 34 calculates the q axis voltage command value * Vq by control that amplifies the difference ΔIq by a PI operation or the like.

The d axis voltage command value * Vd output from the current control unit 33 and the q axis voltage command value * Vq output from the current control unit 34 are input into the dq 3-phase alternating current coordinate transformer 38.

The dq 3-phase alternating current coordinate transformer 38 transforms the d axis voltage command value * Vd and the q axis voltage command value * Vq on the dq coordinate system into, for example, a U phase alternating current voltage command value * Vu, a V phase alternating current voltage command value * Vv, and a W phase alternating current voltage command value * Vw on a 3-phase alternating current coordinate system, which is a stationary coordinate system.

In addition, the U phase alternating current voltage command value * Vu, the V phase alternating current voltage command value * Vv, and the W phase alternating current voltage command value * Vw output from the dq 3-phase alternating current coordinate system transformer 38 are supplied to the inverter 13 as switching commands in order to turn the switching element of the inverter 13 ON and OFF.

Below, the constant detecting apparatus 15 will be explained while referring to FIG. 1 to FIG. 3.

As shown in FIG. 3, the detecting unit 26 is structured comprising, for example, a rotation sensor 41, a torque sensor 42, a position sensor 43, a rotor temperature sensor 44, a winding temperature sensor 45, a phase voltage detector 46, and for example, two phase current detectors 47 and 47.

The rotation sensor 41 detects the number N of rotations of the rotor (not illustrated) of the motor 11.

The torque sensor 42 detects the motor torque Tor output from the motor 11.

The position sensor 43 detects the magnetic pole position θre (phase angle) of the rotor (not illustrated) of the motor 11. Moreover, the magnetic pole position θre (phase angle) corresponds to the phase angle of the induced voltage.

The rotor temperature sensor 44 detects the motor temperature Tmag, that is, the temperature of the permanent magnet provided in the rotor (not illustrated) of the motor 11.

The winding temperature sensor 45 detects the winding temperatures T1, . . . , Tn (where n is an arbitrary natural number), that is, the temperature at a plurality of predetermined positions for the motor windings that are wound around the stator of the motor 11.

The phase voltage detector 46 detects the phase voltage (for example, the U phase voltage Vun between the U phase output point U and the neutral point N between each of the phase output points of the inverter 13) supplied to each phase of the motor 11, and based on the detected signal, the phase and the effective value of the primary component of the phase voltage, and furthermore, the effective value that includes all frequency components are calculated in the ECU 12.

The phase current detectors 47 and 47 detect the phase current Im (for example the U phase current Iu) supplied to each phase of the motor 11, and based on the detected signal, the phase and effective value of the primary component of the phase current and the effective value that includes all frequency components are calculated in the ECU 12.

In addition, as shown in FIG. 2, the calculating unit 27 of the constant detecting apparatus 15 comprises, for example, an alternating current·dq coordinate system transformer 51, a d axis/q axis current calculating unit (Id·Iq calculating unit) 52, an induced voltage constant calculating unit (the Ke calculating unit) 53, and the d axis/q axis inductance estimation calculating unit (the Ld·Lq estimation calculating unit) 54.

The alternating current/dq coordinate system transformer 51 transforms a suitable phase of the current, for example, the U phase current Iu, on the static coordinate system to the d axis current Id and the q axis current Iq on the rotating coordinate system, that is, the dq coordinate system, following the rotating phase of the motor 11.

The d axis/q axis current calculating unit 52, as will be described below, outputs the d axis current Id and the q axis current Iq after compensation to the feedback control unit 23 as a new d axis current Id and q axis current Iq. In this compensation, the iron loss component is eliminated by carrying out a predetermined compensating processing on the calculated d axis current Id and the q axis current Iq that include the iron loss component in the current/dq coordinate system transformer 51.

As will be described below, the induced voltage constant calculating unit 53 searches in a map, for example, a preset map or the like, for the induced voltage constant Ke that changes depending on the motor temperature Tmag, based on the motor temperature Tmag while the motor 11 is being driven.

As will be described below, the d axis/q axis inductance estimation calculating unit 54 calculates the d axis inductance Ld and the q axis inductance Lq during actual operation of the motor 11, and outputs these to the ECU 12.

The motor control apparatus 10 according to the present embodiment comprises the structure described above. Next the operation of this motor control apparatus 10, and in particular, the constant detecting apparatus 15, will be explained referring to the drawings.

Figure 4:
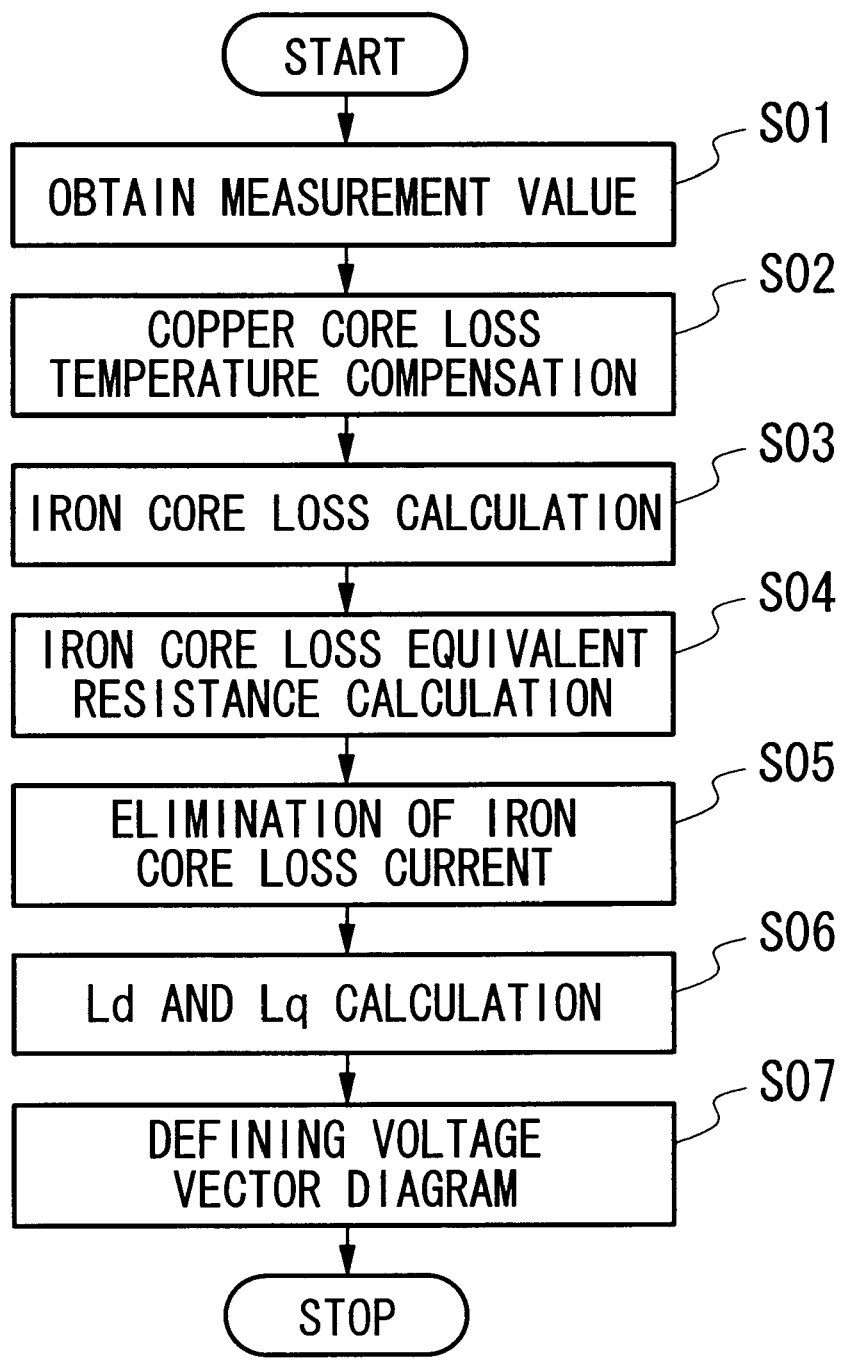
FIG. 4 is a flowchart showing an outline of the operation of the constant detecting apparatus of the brushless DC motor.
Figure 5A:
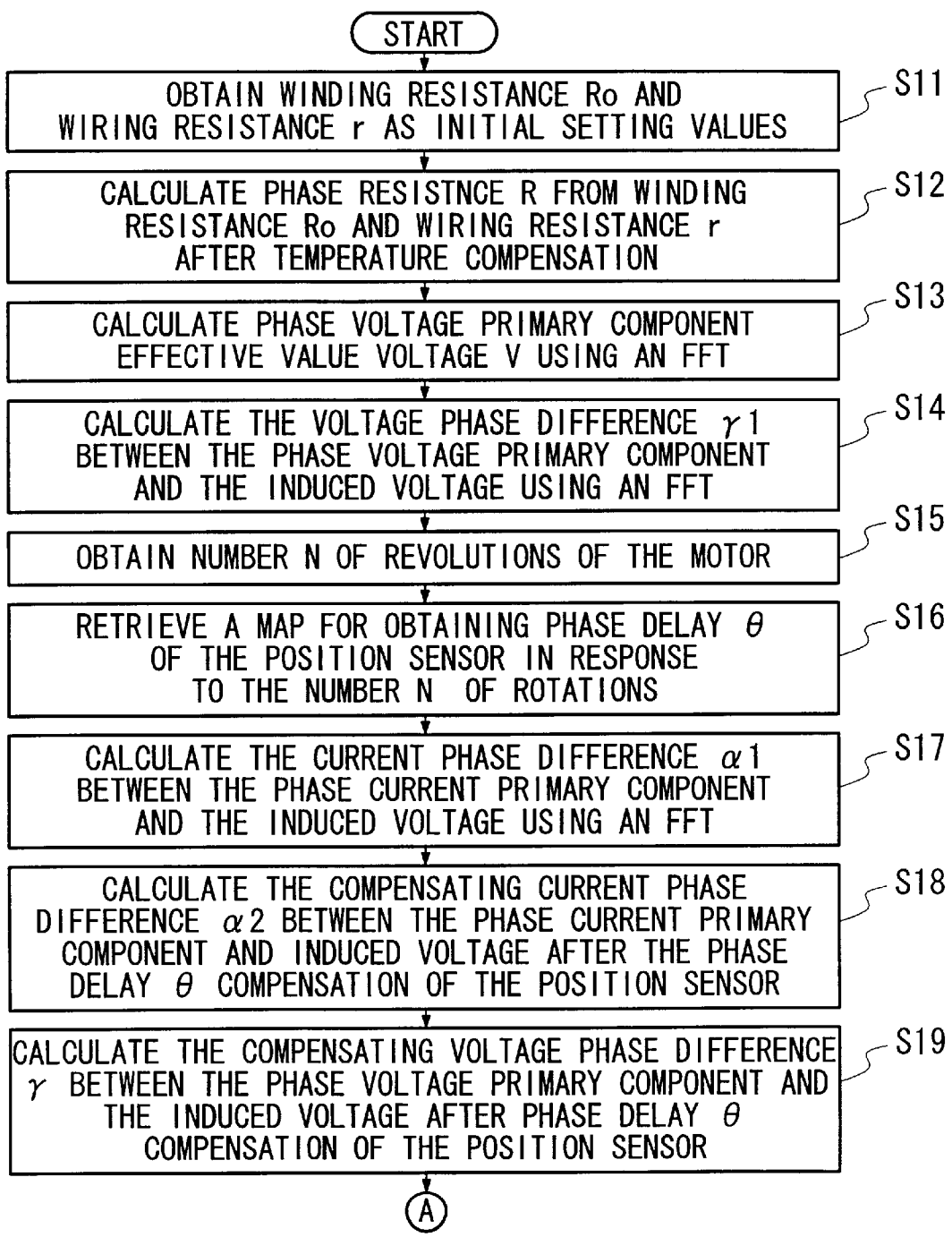
FIGS. 5A and 5B are flowcharts showing the concrete operational actions of the constant detecting apparatus of the brushless DC motor.
Figure 5B:
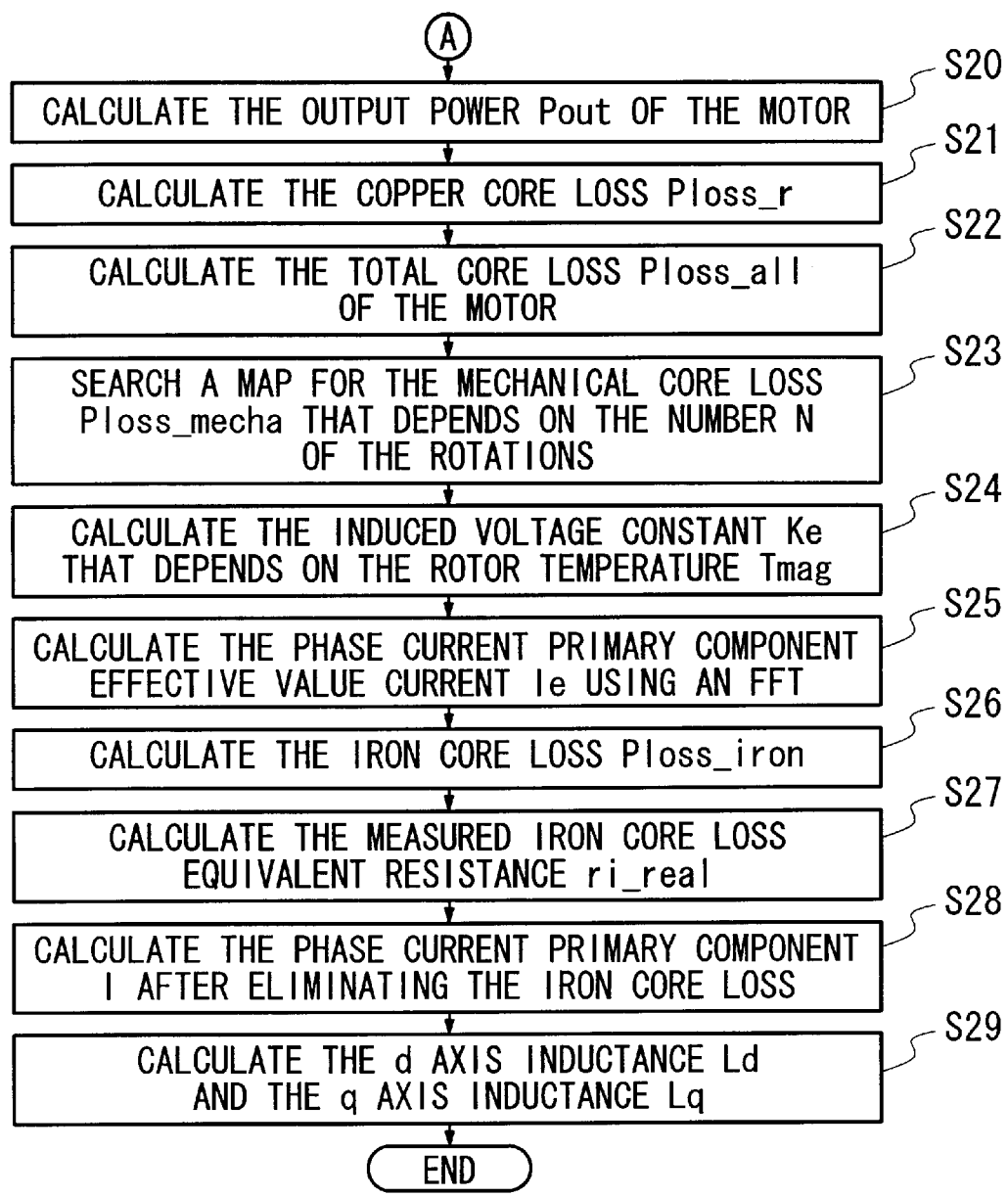
Figure 6:
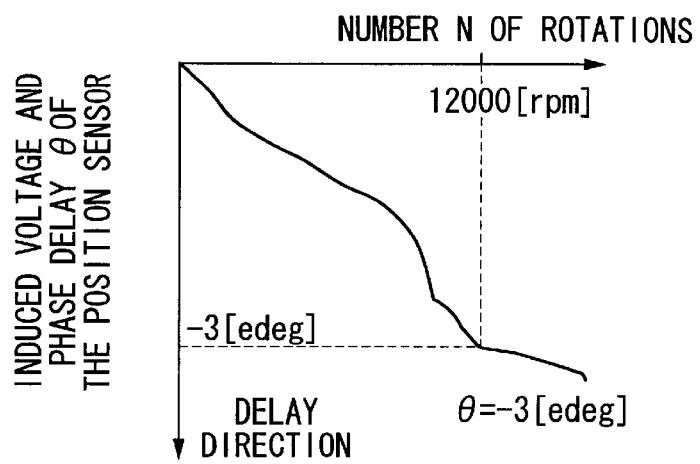
FIG. 6 is a graph showing the phase delay θ of the induced voltage found from the magnetic pole position θre detected in the position sensor that changes along with the change in the number N of rotations.
Figure 7:
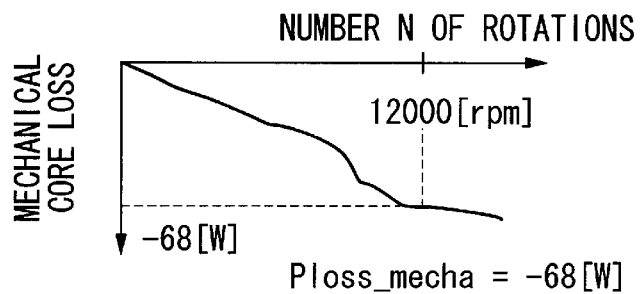
FIG. 7 is a graph showing the mechanical loss Ploss__mecha that changes along with the change in the number N of rotations.
Figure 8:
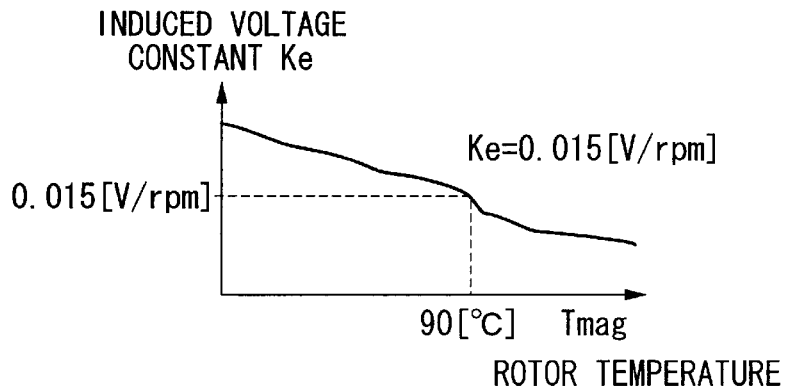
FIG. 8 is a graph showing the induced voltage constant Ke that changes along with the change in the rotor temperature Tmag.
Figure 9:
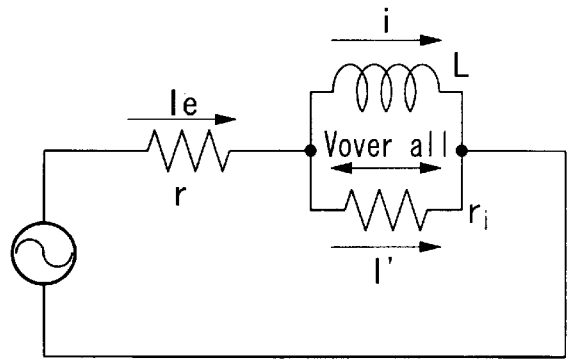
FIG. 9 is a drawing showing a model of the method for eliminating the iron loss current using the parallel circuit parameters.
Figure 10:
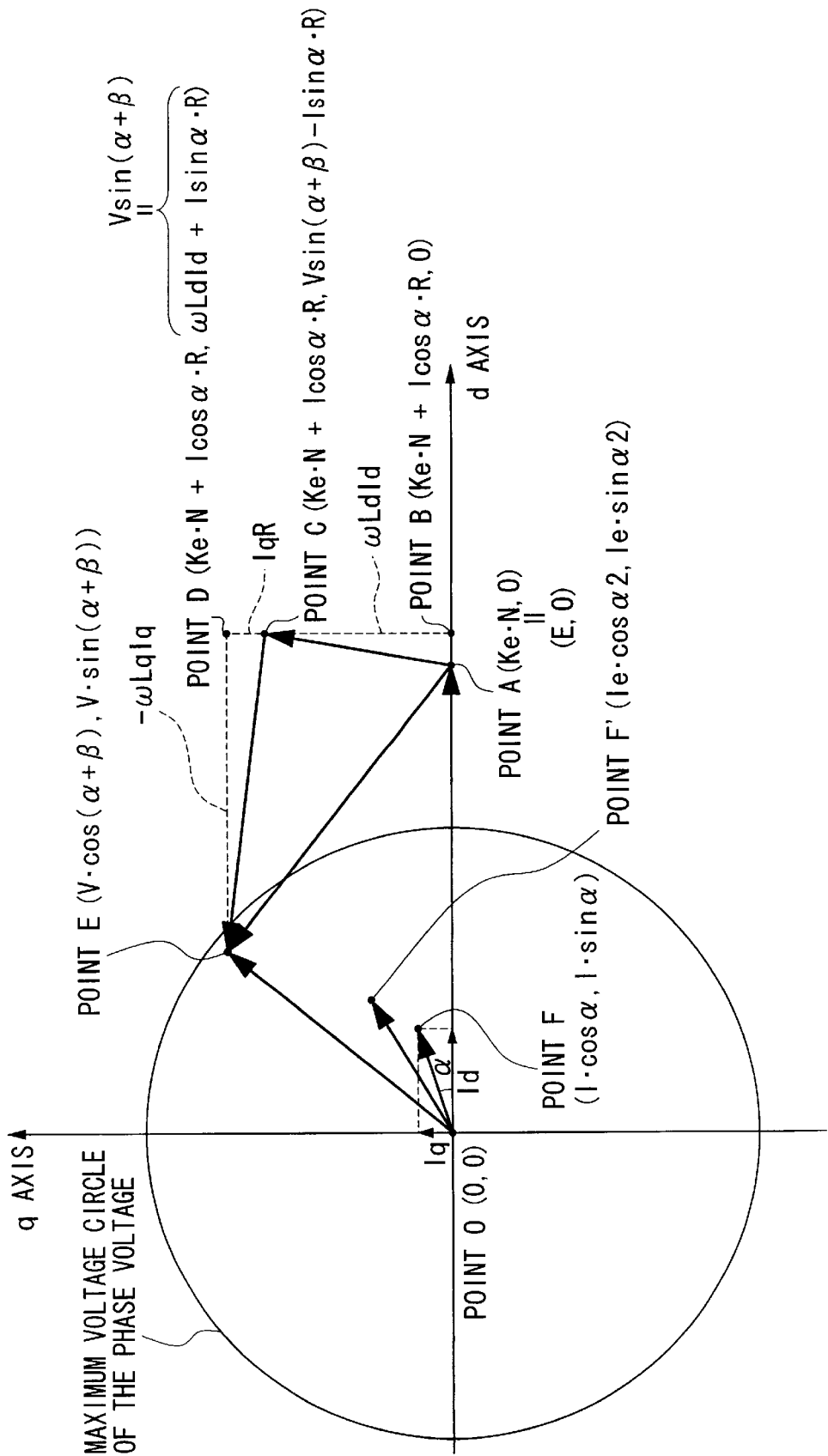
FIG. 10 is a drawing showing the voltage vector diagram using the parallel circuit parameters shown in FIG. 9.

FIG. 4 is a flowchart showing an outline of the operation of the constant detecting apparatus 15; FIGS. 5A, 5B are a flowchart showing the concrete calculating operation of the constant detecting apparatus 15; FIG. 6 is a graph showing the phase delay θ of the induced voltage found from the magnetic pole position θre detected in the position sensor 43 that changes along with the change in the number N of rotations; FIG. 7 is a graph showing the mechanical loss Ploss_mecha that changes along with changes in the number N of rotations; FIG. 8 is a graph showing the induced voltage constant Ke that changes along with the change in the rotor temperature Tmag; FIG. 9 is a drawing showing a model of the method for eliminating the iron loss current using parallel circuit parameters; and FIG. 10 is a drawing showing a voltage vector diagram using the parallel circuit parameters of FIG. 9.

First, in step S01 shown in FIG. 4, each of the detected signals (measured values) from the detecting units 26 is obtained.

Next, in step S02, the copper loss Ploss_r after temperature compensation is calculated by compensating the winding resistance Ro that changes, for example, depending on the winding temperatures T1, . . . , Tn of the stator (not illustrated) of the motor 11.

Next, in step S03, the iron loss Ploss_iron is calculated based on the total iron loss Ploss_all, the copper loss Ploss_r, and the mechanical loss Ploss_mecha of the motor 11.

Next, in the step S04, as will be described later, the measured iron loss equivalent resistance ri_real is calculated.

Next, in the step S05, the effective phase current (below, referred to as "effective phase current") after eliminating the iron loss is calculated.

Subsequently, in step S06, the d axis inductance Ld and the q axis inductance Lq are calculated based on the phase resistance value, the induced voltage, and the effective current phase difference that are derived using the effective phase current after elimination of the iron loss and the above measured values.

Next, in step S07, the voltage vector diagram is defined based on each of the inductances Ld and Lq.

Below, the concrete calculating operation in the constant calculating unit 27 of the constant detecting apparatus 15 will be explained referring to the figures.

First, in step S11 shown in FIG. 5A, as initial setting values, the winding resistance Ro and the wiring resistance r during a present normal temperature (for example, temperature #T 20°) are read out from data stored in advance in the memory 28.

Subsequently, in step S 12, as shown in the following equation 3, while the motor 11 is being driven, the phase resistance R after temperature compensation is calculated by adding the wiring resistance r to the value obtained by compensating the winding resistance Ro based on the winding temperatures T1, . . . , Tn (where n is an arbitrary natural number) detected at a plurality of predetermined locations on the windings of the stator (not illustrated) of motor 11 and the predetermined temperature slope coefficient C that differs depending on the material of the winding.

$$R = r + Ro \cdot \left\{ 1 + C \times \frac{(T1 - \#T) + \ldots + (Tn - \#T)}{n} \right\} \quad \text{Equation 3}$$

Next, in step S 13, from the phase voltage (for example, the U phase voltage Vun) detected in the phase voltage detector 46, the primary component of the phase voltage is calculated, for example, using a fast Fourier transformer FFT, and then the effective value voltage, that is, the phase voltage primary component effective value voltage V, is calculated with respect to this primary component.

Subsequently, in the step S 14, the voltage phase difference γ1 that represents the phase difference between the phase of the induced voltage and the phase of the primary component of the phase voltage is calculated based on the magnetic pole position θre corresponding to the phase differences of the induced voltage detected in the position sensor 43 and the primary component of the phase voltage obtained, from example, by a fast Fourier transformer FFT, from the phase voltage (for example, the U phase voltage Vun) detected in the phase voltage detector 46.

Next, in step S 15, the number N of rotations of the rotor (not illustrated) of the motor 11 is obtained by the rotation sensor 41.

Next, in step S 16, the phase delay θ of the position sensor 43, which fluctuates depending on the number N of rotations of the motor 11, is found with respect to the induced voltage from the data stored in advance in the memory 28.

This means that in the motor 11, fluctuations of the flux density occur in the magnetic field flux that permeates the windings of the stator due to the rotation of the rotor provided with the permanent magnet, and the induced voltage in the windings is induced. For this induced voltage, the phase of the induced voltage found from the magnetic pole position θre (electrical angle) detected in the position sensor 43 has a phase delay θ that fluctuates with an increasing tendency along with the increase in the number N of rotations of the motor 11, as shown in FIG. 6. The data of the phase delay θ for each of the number N of rotations is stored in the memory 28, and the constant calculating unit 27 finds and reads out the phase delay θ corresponding to the number N of the rotations detected during the rotation driving.

Next, in step S 17, the current phase difference α1 that represents the phase difference between the primary component of the phase current and the induced voltage is calculated based on the phase of the primary component of the phase current obtained, for example, by a fast Fourier transformer FFT, from the phase current Im (for example, the U phase current Iu) detected in the phase current detector 47 and the phase of the induced voltage detected in the position sensor 43.

Subsequently, in step S 18, as shown in the following equation 4, the compensating current phase difference α2 is calculated after compensating the phase delay θ of the position sensor 43, which depends on the number N of the rotations that the rotation sensor 51 has detected, based on the phase delay θ of the position sensor 43 found in step S 16 and the current phase difference α1.

Moreover, this compensating phase difference α2 is used in calculating the magnetic field inductance (the q axis inductance Lq) and the torque axis inductance (d axis inductance Ld), described below, which still include the iron loss component.

$$\alpha 2 = \alpha 1 - \theta \qquad \text{Equation 4}$$

Next, in step S 19, as shown in the following equation 5, the compensating voltage phase difference γ, which represents the phase difference between the primary component of the phase voltage after compensation, and the phase of the induced voltage are calculated by subtracting the phase delay θ of the position sensor 43 from the voltage phase difference γ1 based on the voltage phase difference γ1 representing the phase difference between the phase of the induced voltage detected by the position sensor 43 calculated in step S 14 and the phase delay θ of the position sensor 43 that is found depending on the number N of rotations in step S 16.

This compensating voltage phase difference γ serves as the effective voltage phase difference between the primary component of the phase voltage and the induced voltage, and is used in the calculation of the magnetic field axis inductance (q axis inductance Lq), described below, and the torque axis inductance (d axis inductance Ld).

$$\gamma = \gamma 1 - \theta \qquad \text{Equation 5}$$

Next, in step S 20, as shown in the following equation 6, the output power Pout of the motor 11 is calculated based on the number N of rotations of the motor 11 detected in the rotation sensor 41 and the motor torque Tor detected in the torque sensor 42.

$$\text{Pout} = \text{Tor} \cdot N \qquad \text{Equation 6}$$

Next, in step S 21, as shown in the following equation 7, the copper loss Ploss_r is calculated based on the phase resistance value R calculated in step S 12 and the phase current Im (for example, the U phase current Iu) that is the effective current value that includes all of the frequency components of the phase current detected in the phase current detector 47.

$$\text{Ploss\_r} = 3 \cdot Im^2 \cdot R \qquad \text{Equation 7}$$

Next, in step S 22, as shown in the following equation 8, the total loss Ploss_all of the motor 11 is calculated by subtracting the output power Pout of the motor 11 calculated in step S 22 from the detected value of the motor input power Pin supplied to the motor 11 from the inverter 13.

$$\text{Ploss\_all} = \text{Pin} - \text{Pout} \qquad \text{Equation 8}$$

Subsequently, in step S 23, the mechanical loss Ploss_mecha that changes depending on the number N of rotations of the motor 11 is searched for in the data map stored in advance in the memory 28. Here, as shown in FIG. 7, the mechanical loss Ploss_mecha possesses the property of changing at an increasing tendency accompanying an increase in the number N of rotations, the value of the mechanical loss Ploss_mecha for each of the number N of rotations is stored in memory 28, and the constant calculating unit 27 finds and reads out the value of the mechanical loss Ploss_mecha that corresponds to the number N of rotations detected during the driving of the rotation.

Next, in step S 24, based on the rotor temperature Tmag detected in the rotor temperature sensor 44 while the motor is being driven, the induced voltage constant Ke that changes depending on the rotation temperature Tmag is searched for and read out from a map such as a data map stored in advance in the memory 28. Additionally, as shown in the following equation 9, the induced voltage E after temperature compensation is calculated based on the induced voltage constant Ke and the number N of rotations.

Moreover, as shown in FIG. 8, the induced voltage constant Ke changes with a slightly decreasing tendency accompanying an increase in the rotor temperature Tmag.

$$E = Ke \cdot N \qquad \text{Equation 9}$$

Next, in step S 25, the effective value current of the primary component of the phase current, that is, the phase current primary component effective value current Ie that is obtained, for example, by a fast Fourier transformer FFT, from the phase current Im (for example, the U phase current Iu) detected in the phase current detector 47 is calculated.

Next, in step S 26, as shown in the following equation 10, the iron loss Ploss_iron is calculated by subtracting the copper loss Ploss_r calculated in step S 21 and the mechanical loss Ploss_mecha found in step S 23 from the total loss Ploss_all of the motor 11 calculated in step S 22.

$$\text{Ploss\_iron} = \text{Ploss\_all} - \text{Ploss\_r} - \text{Ploss\_mecha} \qquad \text{Equation 10}$$

Next, in step S 27, as shown in the following equation 11, the measured iron loss equalized resistance ri_real is calculated based the effective value Vall that includes all frequency components of the phase voltage obtained, for example, by a fast Fourier transformer FFT from the phase voltage (for example, the U phase voltage Vun) detected in the phase voltage detector 46 and the iron loss Ploss_iron calculated in step S 26.

Moreover, as shown in FIG. 9 described below, when the following equation 11 is calculated, for example, the method for eliminating the iron loss current using the parallel circuit parameters is applied to the three phase windings, and three times the value of the iron loss equivalent resistor ri is calculated.

$$\text{ri\_real} = 3 \cdot \frac{(Vall)^2}{\text{Ploss\_iron}} \qquad \text{Equation 11}$$

Next, in step S 28, as shown in the following equation 12, the magnetic field axis current value Iq and the torque axis current value Id after elimination of the iron loss are calculated based on the phase current primary component effective value current Ie calculated in step S 25, the compensating current phase difference α2 that compensates the phase difference between the primary component of the phase current calculated in step S 18 and the phase of the induced current detected by the position sensor 43, the phase voltage primary component effective value voltage V calculated in step S 13, the compensating voltage phase difference (the effective voltage phase difference) γ that compensates the phase difference between the primary component of the phase voltage and the induced voltage after compensating the phase delay θ of the position sensor 43 calculated in step S 19, and the measured iron loss equivalent resistance ri_real calculated in step S 27. The effective current phase difference α after eliminating the iron loss from each of the calculated current values Id and Iq is calculated, and then the phase current primary component I after eliminating the iron loss based on the calculated effective current phase difference α is calculated.

$$Id = I \cdot \cos\alpha = Ie \cdot \cos(\alpha 2) V \cdot \cos\frac{\lambda}{ri\_real}$$ Equations 12

$$Iq = I \cdot \sin\alpha = Ie \cdot \sin(\alpha 2) - \frac{V \cdot \sin\gamma}{ri\_real}$$

$$\alpha = \tan^{-1}\left(\frac{I\sin\alpha}{I\cos\alpha}\right)$$

$$I = \frac{I\cos\alpha}{\cos\alpha} = \frac{I\sin\alpha}{\sin\alpha}$$

Next, in step S 29, as shown in the following equation 13, the d axis (torque axis) inductance Ld and the q axis (magnetic field axis) inductance Lq are calculated based on the number of poles P of the motor 11, the angular velocity ω, the compensating voltage phase difference (effective voltage phase difference) γ, the effective current phase difference α after elimination of the iron loss and the phase current primary component I after elimination of the iron loss that was calculated in step 28, the phase resistance value R calculated in step S 12, the induced voltage E after temperature compensation calculated in step S 24, the phase voltage primary component effective value voltage V calculated in step S 13, and the sequence of the processing is completed.

$$Ld = \frac{V \cdot \sin(\alpha + \beta) - I \cdot R \cdot \sin\alpha}{I \cdot \omega \cdot \cos\alpha}$$ Equations 13

$$Lq = \frac{E + I \cdot \cos\alpha \cdot R - V \cdot \cos(\alpha + \beta)}{I \cdot \omega \cdot \sin\alpha}$$

$$\beta = \gamma - \alpha$$

$$\omega = \frac{N \cdot P \cdot 2 \cdot \pi}{60}$$

Below, an example of the calculation of the d axis (torque axis) inductance Ld and the q axis (magnetic field axis) inductance Lq will be explained.

First, as an initial set value, the winding resistance Ro=0.035 [Ω] and the preset wiring resistance r=0.004 [Ω] at the normal temperature are read.

Next, the preset temperature slope coefficient C=0.00393 of the lead wire and detected the winding temperatures T1=115 [°C.], T2=100 [°C.], and T3=121 [°C.] are substituted into equation 3, and the phase resistance value R=0.052 [Ω] is calculated.

Next, the phase voltage primary component effective value V=115 [V] calculated by Fourier transforming the phase voltage using a fast Fourier transformer FFT is obtained, and then the voltage phase difference γ1=60 [edeg] between the phase of the primary component of the phase voltage obtained using the fast Fourier transformer FFT and the phase of the induced voltage found from the signal of the position sensor 43 is calculated.

Next, the number N of rotations=12000/60 [1/s] is detected using the detected signals from the rotation sensor 41, and the phase delay θ=−3 [edeg] when the number N of rotations=12000/60 [1/s] is read from the data map.

Next, the current phase difference α1=63 [edeg] between the phase of the phase current primary component calculated by Fourier transforming the phase current using a fast Fourier transformer FFT and the phase of the above induced voltage is calculated.

Next, by the above equation 4, the compensating current phase difference α2=α1−θ=63−(−3)=66 [edge] for the phase difference between the phase of the phase current primary component after compensating the phase delay θ of the position sensor 43 and the induced voltage phase is calculated.

Next, by the above equation 5, the phase difference γ=γ1−θ=42−(−3)=45 [edge] between the phase of the phase voltage primary component after compensating the phase delay θ of the position sensor 43 and the induced voltage phase is calculated.

In addition, as represented in the following equation 14, the output power Pout=25133 [W] is calculated using the above equation 6 based on the number N of the rotations and the torque Tor of the motor 11.

$$Pout = Tor \cdot N$$ Equation 14

$$= 20[Nm] \cdot \frac{12000}{60}[1/s] \times 2 \times \pi$$

$$= 25133[W]$$

In addition, as shown in the following equation 15, the iron loss Ploss_r=1130 [W] is calculated using the above equation 7 based on the phase resistance value R and the phase current Im.

$$Ploss\_r = 3 \cdot (Im)^2 \cdot R = 3 \cdot (85.1)^2 \cdot 0.02 = 1130[W]$$ Equation 15

In addition, as shown in the following equation 16, the total loss Ploss_all=1945 [W] of the motor 11 is calculated using the above equation 8 based on the output power Pout and the motor input power Pin supplied from the inverter 13.

$$Ploss\_all = Pin - Pout = 27078 - 25133 = 1945[W]$$ Equation 16

Next, the mechanical loss Ploss_mecha=−68 is searched for and obtained using the number N of rotations, the induced voltage constant Ke after the temperature compensation is searched for and obtained based on the rotor temperature Tmag, and as shown in the following equation 17, the induced voltage E=180 [V] after temperature compensation using the above equation 9 is calculated based on these.

$$E = Ke \cdot N = 0.015 \cdot 12000 = 180[V] \qquad (17)$$

Next, the phase current primary component effective value current Ie=83.5 [A] is calculated using a fast Fourier transformer FFT, and as shown in the following equation 18, the iron loss Ploss_iron=747 [W] is calculated using the above equation 10 from the total loss Ploss_all, the copper loss Ploss_r, and the mechanical loss Ploss_mecha of the motor 11.

$$Ploss\_iron = Ploss\_all - Ploss\_r - Ploss\_mecha = 1945 - 1130 - 68$$
$$= 747[W]$$ Equation 18

Next, as shown in equation 19, the measured iron loss equivalent resistance ri_real=69 [106] is calculated using the effective value Vall that includes all the frequency components of the phase voltage, the iron loss Ploss_iron, and the above equation 11.

$$ri\_real = 3 \cdot \frac{(Vall)^2}{Ploss\_iron}$$ Equation 19

$$= 3 \cdot \frac{(131)^2}{747}$$

$$= 69[\Omega]$$

Next, as shown in the following equation 20, the phase current primary component I·cos α=33 [A] and I·sin α=75 [A] after elimination of iron loss is calculated using the above equation 12 from the phase current primary component effective value currents Ie·cos α2 and Ie·sin α2.

$$I \cdot \cos\alpha = Ie \cdot \cos(2\alpha) - \frac{V \cdot \cos\lambda}{ri\_real}$$ Equations 20

$$= 83.5 \cdot \cos(66) - \frac{115 \cdot \cos(45)}{(69)}$$

$$= 83.5 \cdot 0.407 - \frac{115 \cdot 0.707}{69} = 33[A]$$

$$I \cdot \sin\alpha = Ie \cdot \sin(\alpha 2) - \frac{V \cdot \sin\gamma}{ri\_real}$$

$$= 83.5 \cdot \sin(66) - \frac{115 \cdot \sin(45)}{(69)}$$

$$= 83.5 \cdot 0.914 - \frac{115 \cdot 0.707}{69} = 75[A]$$

$$\alpha = \tan^{-1}\left(\frac{I \cdot \sin\alpha}{I \cdot \cos\alpha}\right) = \tan^{-1}\left(\frac{75}{33}\right) = 66.2[edeg]$$

$$I = \frac{I \cdot \cos\alpha}{\cos\alpha} = \frac{33}{\cos(66.2)} = 81.8[A]$$

In addition, as shown in the following equation 21, based on the results of the above calculation, the d axis (torque axis) inductance Ld and the q axis (magnetic field axis) inductance Lq are calculated using the above equation 13.

$$Lq = \frac{E + I \cdot \cos\alpha \cdot R - V \cdot \cos(\alpha + \beta)}{I \cdot \omega \cdot \sin\alpha}$$

$$= \frac{180 + 81.8 \cdot \cos(66.2) \cdot 0.052 - 115 \cdot \cos\{66.2(45 - 66.2)\}}{81.8 \cdot (12000 \cdot 4 \cdot 2 \cdot \pi/60) \cdot (66.2)}$$

$$= 0.000267[H]$$

Below, the method for calculating the measured iron loss equivalent resistance ri_real in step 27 described above will be explained referring to FIG. 9.

As shown in FIG. 9 and in the following equation 22, the d axis phase current Ied and the q axis phase current Ieq of the phase current Ie that includes the iron loss are represented as the d axis phase current Id and the q axis phase current Iq that does not include iron loss summed with the d axis phase current Id' and the q axis phase current Iq' of the iron loss current I'.

$$Ied = Id + Id' \quad Ieq = Iq + Iq'$$ Equations 22

Here, as shown in the following equation 23, the iron loss Ploss_iron is represented by the iron loss equivalent resistance ri and the voltage Voverall of the iron loss equivalent resistance ri at both ends.

$$Ploss\_iron = \frac{(Voverall)^2}{r_i}$$ Equation 23

As shown in the following equation 24, the d axis phase current Id and the q axis phase current Iq that do not include the iron loss phase current is represented by equation 22 and equation 23 described above, and the d axis phase voltage Vd and the q axis phase voltage Vq, and the d axis phase current Id and the q axis phase current Iq of the above equation 12 are calculated by using the method for calculating the iron loss elimination based on the following equation 24.

$$Id = Id' - \frac{Vd}{r_i} = Id' - \frac{Ploss\_iron \cdot Vd}{(Voverall)^2}$$ Equations 24

$$Iq = Iq' - \frac{Vq}{r_i} = Iq' - \frac{Ploss\_iron \cdot Vq}{(Voverall)^2}$$

FIG. 10 shows that voltage torque diagram using the parallel circuit parameters of FIG. 9.

In defining the vector diagram, point F Id(I·cos α, I·sin α) on the dq coordinate system is found using each of the phase currents Id(I·cos α) and Iq(I·sin α) that have eliminated the iron loss component derived from the calculation method described above.

Next, the point A(Ke·N, 0) on the d axis, which shows the induced voltage E after temperature compensation, is found based on the induced voltage constant Ke and the number N of rotations taking into consideration the fluctuation of the induced voltage that accompanies the temperature change of the rotor.

Next, using the phase resistance value R that takes into consideration the fluctuation of the copper loss, point B(Ke·N+I·cos α·R, 0) on the d axis, on which the voltage drop of the d axis component due to the phase resistance value R is represented by the distance between point A and point B, is found.

Equations 21

Next, the point E(·cos(α+β), V·sin(α+β)) is found from the phase voltage primary component effective value voltage V, the effective current phase difference α, and the effective voltage phase difference γ.

Next, the point D(Ke·N+1·cos α·R, V·sin(α+β)) that shows the voltage drop of the magnetic field axis (the q axis) from point B is found. Here, β=γ−α.

Next, the point C(Ke·N+1·cos α·R, V·sin(α+β)−I·sin α·R) that shows the voltage drop of the magnetic field axis (q axis) inductance Lq from point B is calculated.

As shown above, the voltage vector diagram can be defined by finding the vector coordinates in the sequence point F, point A, point B, point E, point D, and point C.

Moreover, in the case that the phase current that includes the iron loss component is used, like point F'(Ie·cos 2α, Ie·sin 2α), because a deviation in the phase voltage that includes an error occurs, defining an accurate voltage vector diagram is difficult.

In the present embodiment, as shown in the above equation 12, a high precision phase current Id that takes into consideration the fluctuation of the copper loss, the fluctuation of the induced voltage, and the detection error in the position sensor 43, in addition to eliminating the iron loss component, can be found by using the phase resistance value R that takes into consideration the fluctuation of the copper loss, the induced voltage constant Ke that takes into consideration the fluctuation of the induced voltage that accompanies the temperature change of the rotor, the phase difference α2 that takes into consideration the detection error of the position sensor 43, and the measured iron loss equivalent resistance ri_real that is an iron loss component.

In addition, as shown in the above equation 12, a phase difference α that eliminates the iron loss component from the high precision phase current Id and Iq can be calculated, as shown in the above equation 13, the d axis (torque axis) inductance Ld and the q axis (magnetic field axis) inductance Lq can be calculated with high precision, and thus the voltage vector diagram can be easily defined with high precision.

Therefore, the voltage vector diagram that eliminates the iron loss component can be displayed in the display unit 29 provided in the constant detecting apparatus 15. In the display unit 29, it is also possible to display the detected values or the calculated values used in calculating the constants, such as the current phase difference α1 that includes the iron loss and the phase error difference, the compensating effective current phase difference α2 that includes the iron loss and does not include the phase error, the voltage phase difference γ1 that includes the phase error, the compensating voltage phase difference γ that does not include the phase error, the d axis phase current (the torque axis current value) Id that does not include the iron loss phase current, the q axis phase current (magnetic field axis current value) Iq that does not include the iron loss phase current, the d axis phase voltage Vd, and q axis phase voltage Vq.

As explained above, according to the constant detecting apparatus 15 of the brushless DC motor in the present embodiment, the magnetic field axis inductance Ld and the torque axis inductance Lq can be calculated with high precision by compensating the fluctuation of the copper loss, the fluctuation of the induced voltage, the detected error due to the phase delay of the position sensor 43, and the discrepancy of the phase current due to the iron loss based on each of the detected signals output from each of the sensors 41, . . . 45 and each of the detectors 46 and 47 that form the detecting unit 26.

Furthermore, according to the control apparatus 10 of the brushless DC motor that comprises the constant detecting apparatus 15 in the present invention, during the control of the brushless DC motor 11, accurate d axis target current * Id (torque axis current command value) and the q axis target current * Iq (magnetic field axis current command value) depending on the torque command * T can be calculated by using the d axis (torque axis) inductance Ld and the q axis (magnetic field axis) inductance Lq which have been detected with high precision, and the precision of the initial response can be increased. Furthermore, feedback control can be carried out based on the d axis current Id and the q axis current Iq that do not include the iron loss component, and the responsiveness and the operational efficiency during control can be increased.

Figure 11:
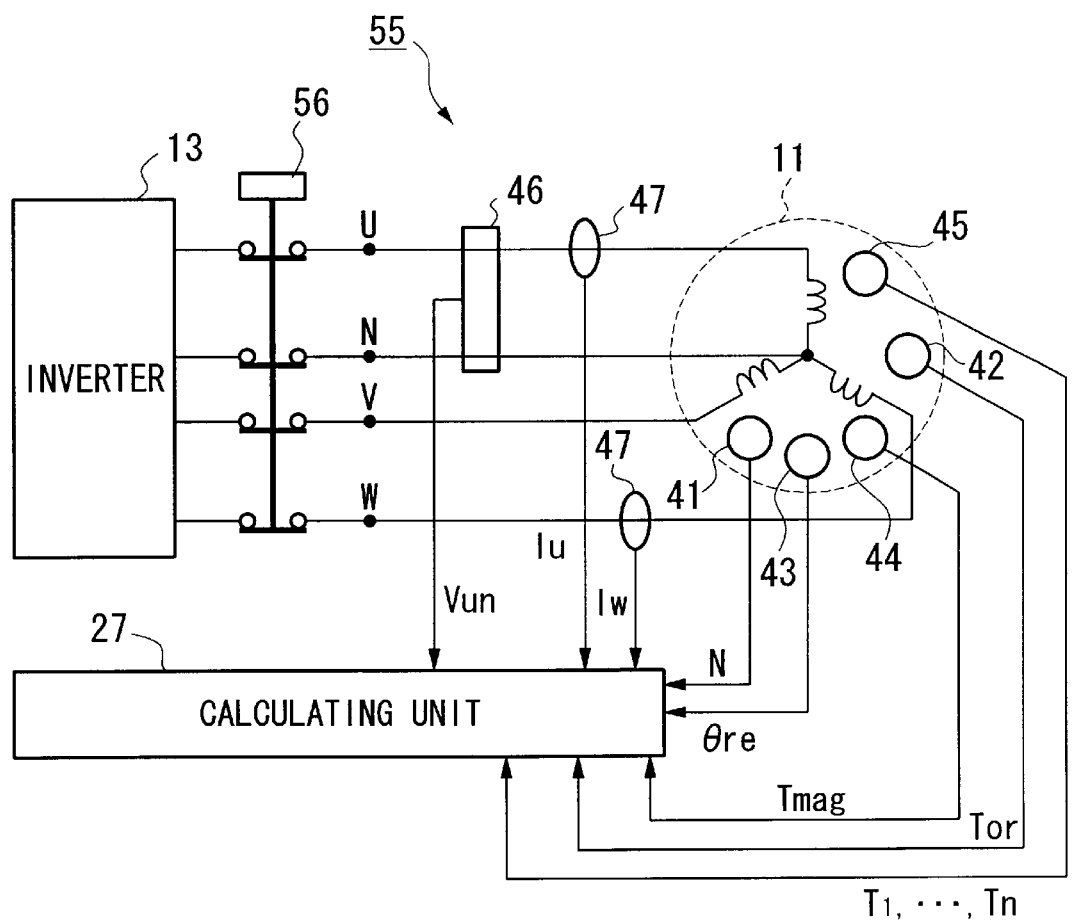
FIG. 11 is a structural diagram of a constant detecting apparatus of the brushless DC motor according to a modification of the present embodiment.

Moreover, in the embodiment described above, in step S 24, the induced voltage E was calculated based on the induced voltage constant Ke after temperature compensation obtained from memory 28 by searching a map, but as in the constant detecting apparatus 55 for a brushless DC motor according to the modification of the present embodiment shown in FIG. 11, an interruption circuit 56 comprising a contact or the like that can interrupt the power supply to the motor 11 can be provided between the inverter 13 and the motor 11, and the calculation of each of the inductances Ld and Lq can be carried out by detecting the voltage value of the induced voltage E directly by temporarily interrupting the power supply while the motor 11 is being driven.

In this case, in the above equation 9, the induced voltage constant Ke can be calculated by the detected induced voltage E and the number N of the rotations of the motor 11, and the induced voltage constant Ke can be accurately and easily calculated simply by measuring the induced voltage waveform of the brushless DC motor using the phase voltage detector 46.

Furthermore, the number N of rotations of the motor 11 can be calculated from the induced voltage detected by the phase voltage detector 46 during the interruption of the power supply to the motor 11, and thereby eliminate the rotation sensor 41.

In addition, in the case that there is no connection line at the neutral point from the motor 11, the phase voltage detector 46 can detect the voltage between the lines of the U-V phase, V-W phase, and the W-U phase, and an identical operational effect can be attained using these interline voltages.

Moreover, the constant detecting apparatuses 15 and 55 of the brushless DC motor according to the embodiment of the present invention can be realized by dedicated hardware, or can be structured by memory and a CPU, and these functions can be realized by loading into memory and executing a program (a program for detecting the constant of the brushless DC motor) for realizing the function of the constant detecting apparatuses 15 and 55.

In addition, the constant detecting of the brushless DC motor can be carried out by recording on a computer readable recording media a constant detecting program for a brushless DC motor according to the above-described present invention and reading and executing in a computer the program recorded on this recording media. Moreover, what is termed "computer system" includes the OS and hardware such as peripherals.

In addition, what is termed the "computer readable recording media" includes portable media such as floppy discs, magneto-optical discs, ROMs, and CD-ROMs, and storage apparatuses such as hard discs built into the computer system. Furthermore, what is termed "computer readable recording media" includes devices that temporarily and dynamically store a program such as a telecommunication network in the case of transmitting the program via a network such as the Internet or a communication line such as a telephone line, and in this case, includes devices that temporarily store programs such as the volatile memory in a computer that serves as a server or client.

In addition, the above program can realize a part of the functions described above, and furthermore, the functions described above can be realized by a combination of programs pre-stored in a computer system.

What is claimed is:

1. A constant detecting apparatus for a brushless DC motor for detecting an inductance of a brushless DC motor which includes a rotor provided with a permanent magnet and a multiphase stator which includes a plurality of stator wirings for generating a rotating magnetic field to cause rotation of the rotor, comprising:

a phase voltage detecting device for detecting a phase angle and an effective value of a phase voltage of said brushless DC motor, a phase current detecting device for detecting a phase angle and an effective value of a phase current, a position detecting device for detecting a phase angle of an induced voltage from the magnetic pole position of said rotor, and a rotation number detecting device for detecting a number of rotations;

a phase resistance value calculating device for calculating the phase resistance value and an induced voltage constant calculating device for calculating an induced voltage constant respectively based on the temperature of said brushless DC motor;

a phase difference calculating device for calculating a voltage phase difference between the induced voltage and the phase voltage and a current phase difference between phases of the induced voltage and said phase current;

a phase compensation value calculating device for calculating a phase compensation value which is used for compensating said voltage phase difference and said current phase difference based on said number of rotations;

an iron loss calculating device for calculating an iron loss of said brushless DC motor;

an effective phase current calculating device for calculating the effective phase current by subtracting the iron loss component from said phase current; and an inductance calculating device for calculating a magnetic field axis inductance and a torque axis inductance based on said phase resistance value, said number of rotations, said induced voltage constant, said voltage phase difference, said current phase difference, said phase compensating value, and said effective phase current.

2. A constant detecting apparatus for a brushless DC motor according to claim 1, further comprising an output torque detecting device for detecting the output torque of said brushless DC motor, wherein said iron loss calculating device comprises:
  a motor power calculating device for calculating a motor output power and a motor input power of said brushless DC motor based on said output torque and said number of rotations;
  a copper loss calculating device for calculating the copper loss based on said phase resistance value and said phase current;
  a total motor loss calculating device for calculating the total motor loss by subtracting said motor output power from said motor input power;
  a mechanical loss calculating device for calculating the mechanical loss of said brushless DC motor;
  a subtracting device for calculating said iron loss by subtracting said copper loss and said mechanical loss from said total motor loss; and
  an equivalent resistance value calculating device for calculating a measured iron loss equivalent resistance value based on the effective value of said phase voltage including all frequency components and said iron loss.

3. A constant detecting device for a brushless DC motor according to claim 1, wherein
  said phase resistance value calculating device calculates said phase resistance value based on the temperature of said stator windings; and
  said induced voltage constant calculating device calculates said induced voltage constant based on the temperature of said rotor.

4. A constant detecting device for a brushless DC motor having a rotor which has a permanent magnet and a multiphase stator which generates a rotating magnetic field for causing rotation of the rotor, and the brushless DC motor is rotated by an electric switching device comprises:
  a stator winding temperature detecting device for detecting the temperature of said rotor windings;
  a rotor temperature detecting device for detecting the temperature of said rotor;
  a phase voltage detecting device for detecting the phase angle and the effective value of the phase voltage;
  a phase current detecting device for detecting the phase angle and the effective value of the phase current;

a position detecting device for detecting the phase angle of the induced voltage from the magnetic pole position of the rotor;

a rotation number detecting device for detecting the number of rotations;

an output torque detecting device for detecting the output torque;

a phase difference detecting device for calculating the voltage phase difference between phases of the induced voltage and the phase voltage and the current phase difference between phases of the induced voltage and the phase current;

a storage device that stores the winding resistance value of said windings and the wiring resistance value of the connecting wiring of said brushless DC motor at a predetermined temperature, said voltage phase difference set in advance depending on said number of rotations and the mechanical loss that is set in advance depending on the compensated value of said current phase difference and said number of rotations, and the induced voltage constant set in advance depending on the temperature of said rotor;

a phase resistance value calculating device for calculating the phase resistance value of said brushless DC motor during rotation based on said winding temperature, said winding resistance value, and said wiring resistance value;

a phase difference compensating device for calculating the compensating voltage phase difference and the compensating current phase difference that compensate said current phase difference and said voltage phase difference based on said compensating value;

a motor power calculating device for calculating the motor output power and the motor input power of said brushless DC motor based on said output torque and said number of rotations;

a copper loss calculating device for calculating the copper loss based on an effective value of said phase resistance value including all frequency components and said phase current;

a total motor loss calculating device for calculating the total motor loss by subtracting said motor output power from said motor input power;

a subtracting device for calculating said iron loss by subtracting said copper loss and said mechanical loss from said total motor loss;

an equivalent resistance value calculating device for calculating the measured iron loss equivalent resistance value based on the effective value of said phase voltage that includes all frequency components and said iron loss;

an effective phase current calculating device for calculating the effective phase current excluding the iron loss component by subtracting the iron loss component from the effective value of said phase current and an effective phase difference calculating device for calculating the effective current phase difference excluding the iron core component from said compensating current phase difference, based on the magnetic filed axis current value and the torque axis current value of said effective phase current; and an inductance calculating device for calculating the magnetic field axis inductance and the torque axis inductance based on said phase resistance value, said number of rotations, said induced voltage constant, said effective phase current, said compensating voltage phase difference, and said effective current phase difference.

5. A control apparatus for a brushless DC motor for rotating a brushless DC motor including a rotor provided with a permanent magnet and a multiphase stator having stator windings which generate a rotating field for rotating the rotor, using an electric switching device including a plurality of switching elements for sequentially commuting electricity to said stator windings, comprises:

a phase voltage detecting device for detecting the phase angle and the effective value of the phase voltage of said brushless DC motor and a phase current detecting device for detecting the phase angle and the effective value of the phase current;

a position detecting device for detecting the phase angle of the induced voltage from the magnetic pole position of said rotor and a rotation number detecting device for detecting the number of rotations;

a phase resistance value calculating device for calculating the phase resistance value and an induced voltage constant calculating device for calculating the induced voltage constant, based on the temperature of said brushless DC motor;

a phase difference calculating device for calculating the voltage phase difference comprising the difference between the phases of said induced voltage and said phase current and the current phase difference comprising the difference between the phases of the induced voltage and phase current;

a phase compensating value calculating device for calculating the phase compensating value that compensates said voltage phase difference and said current phase difference based on said number of rotations;

an iron loss calculating device for calculating the iron loss of said brushless DC motor during rotation;

an effective phase current calculating device for calculating the effective phase current based on said iron loss by subtracting the iron loss component from said phase current;

an inductance calculating device for calculating the magnetic field axis inductance and the torque axis inductance based on said phase resistance value, said number of rotations, said induced voltage constant, said voltage phase difference, said current phase difference, said phase compensating value, and said effective phase current;

a torque command input device that inputs the torque command value;

a current command value calculating device for calculating the magnetic field axis current command value and the torque axis current command value based on said induced voltage constant, said magnetic field axis inductance, said torque axis inductance, and said torque command value; and a pulse width modulated signal output device that outputs a pulse width modulated signal to said electric switching device based on said magnetic field axis current command value and said torque axis current command value.

6. A control apparatus for a brushless DC motor according to claim 5, further comprising an output torque detecting device for detecting the output torque of said brushless DC motor, wherein said iron loss calculating device comprises:

a motor power calculating device for calculating the motor output power and the motor input power of said brushless DC motor based on said output torque and said number of rotations;

a copper loss calculating device for calculating the copper loss based on said phase resistance value and said phase current;

a total motor loss calculating device for calculating the total motor loss by subtracting said motor output power from said motor input power;

a mechanical loss calculating device for calculating the mechanical loss of said brushless DC motor;

a subtracting device for calculating said iron loss by subtracting said copper loss and said mechanical loss from said total motor loss; and an equivalent resistance value calculating device for calculating the measured iron loss equivalent resistance value based on the effective value of said phase voltage that include all frequency components and said iron loss.

7. A control apparatus for a brushless DC motor according to claim 5, wherein said phase resistance value calculating device calculates said phase resistance value based on the temperature of said stator windings, and said induced voltage constant calculating device calculates said induced voltage constant based on the temperature of said rotor.

8. A control apparatus for a brushless DC motor that rotates a brushless DC motor including a rotor which has a permanent magnet and a multiphase stator having stator windings which generate a rotating field for rotating the rotor using an electric switching device composed of a plurality of switching elements and by sequentially commuting the electricity to said stator winding comprises:

a phase voltage detecting device for detecting the phase angle and the effective value of the phase voltage of said brushless DC motor;

a phase current detecting device for detecting the phase angle and the effective value of the phase current;

a position detecting device for detecting the phase angle of the induced voltage from the magnetic pole position of said rotor;

a rotation number detecting device for detecting the number of rotations;

a phase resistance value calculating device for calculating the phase resistance value based on the temperature of said brushless DC motor;

a phase compensating value calculating device for calculating the phase compensating value that compensates said voltage phase difference and said current phase difference;

an iron loss calculating device for calculating the iron loss of said brushless DC motor during rotation;

an effective phase current calculating device for calculating the effective phase current by subtracting the iron loss component from said phase current based on said iron loss;

a power supply interrupting device for temporarily interrupting the power source from said electric switching device to said brushless DC motor;

an inductance calculating device for detecting the voltage value of the induced voltage by said phase voltage detecting device during the power supply interruption by said power supply interrupting device, and calculates the magnetic field axis inductance and the torque axis inductance based on said phase resistance value, the voltage value of said induced voltage, said voltage phase difference, said current phase difference, said phase compensating value, and said effective phase current;

a torque command input device that inputs the torque command value;

a current command value calculating device for calculating the magnetic field axis current command value and the torque axis current command value based on said induced voltage, said magnetic field axis inductance, said torque axis inductance, and said torque command value; and a pulse width modulated signal output device that outputs a pulse width modulated signal to said electric switching device based on said magnetic field axis current command value and said torque axis current command value.

9. A control apparatus for a brushless DC motor that rotates a brushless DC motor comprising a rotor that has a permanent magnet and a multiphase stator having stator windings that generate a rotating field that rotates this rotor using an electric switching device that comprises a plurality of switching elements and sequentially commutes the electricity to said stator windings, comprises:

a winding temperature detecting device for detecting the temperature of said stator winding; a rotor temperature detecting device for detecting the temperature of said rotor; a phase voltage detecting device for detecting the phase angle and the effective value of the phase voltage; a phase current detecting device for detecting the phase angle and the effective value of the phase current; a position detecting device for detecting the phase angle of the induced voltage from the magnetic pole position of said rotor; a rotation number detecting device for detecting the number of rotations; an output torque detecting device for detecting the output torque, in order to detect the rotating brushless DC motor by said electric switching device; the control apparatus further comprises:

a phase difference calculating device for calculating the voltage phase difference comprising the difference between the phases of said induced voltage and phase voltage and the current phase difference comprising the differences in the phases of the induced voltage and the phase current;

a memory device which stores the winding resistance value of said winding and the wiring resistance value of the connecting wiring of said brushless DC motor at a predetermined temperature, said pre-set voltage phase difference and the compensated value of said current phase difference that depend on said number of rotations, the preset mechanical loss that depends on said number of rotations, and a preset induced voltage constant that depends on the temperature of said rotor;

a phase resistance value calculating device for calculating the phase resistance value of said brushless DC motor during rotation based on said winding temperature, said winding resistance value, and said wiring resistance value;

a phase difference compensating device for calculating the compensating voltage phase difference and the compensating current phase difference that compensate said current phase difference and said voltage phase difference based on said compensating value;

a motor power calculating device for calculating the motor output power and the motor input power for said brushless DC motor based on said output torque and said number of rotations;

a copper loss calculating device for calculating the copper loss based on said phase resistance value and effective value of said phase current that includes all frequency components;

a total motor loss calculating device for calculating the total motor loss by subtracting said motor output power from said motor input power;

a subtracting device for calculating said iron loss by subtracting said copper loss and said mechanical loss from said total motor loss;

an equivalent resistance value calculating device for calculating the measured iron loss equivalent resistance value based on the effective value of said phase voltage that includes all frequency components and said iron loss;

an effective phase current calculating device for calculating the effective phase current eliminating the iron core component by subtracting the iron loss from the effective value of said phase current based on said measured iron loss equivalent resistance value, and said compensating current phase difference;

an effective phase difference calculating device for calculating the effective current phase difference eliminating the iron loss components from said compensating current phase difference based on the magnetic field axis current value and the torque axis current of said effective phase current;

an inductance calculating device for calculating the magnetic field axis inductance and the torque axis inductance based on said phase resistance value, said number of rotations, said induced voltage constant, said effective phase current, said compensating voltage phase difference, and said effective current phase difference;

a torque command input device which inputs the torque command value;

a current command value calculating device for calculating the magnetic field axis current command value and the torque axis current command value based on said induced voltage constant, said magnetic field axis inductance, said torque axis inductance, and said torque command value; and a pulse width modulated signal output device which outputs a pulse width modulated signal to said electric switching device based on said magnetic field axis current command value and said torque axis current command value.

10. A constant detecting program for a brushless DC motor for making a computer function as a device for calculating the inductance of a brushless DC motor during rotation comprises:

a phase resistance value calculating means for calculating the phase resistance value and an induced voltage constant calculating means for calculating the induced voltage constant, based on the temperature of said brushless motor;

a phase difference calculating means for calculating the voltage phase difference comprising the difference between the phases of said induced voltage and phase voltage and the current phase difference comprising the difference between the phases of the induced voltage and phase current;

a phase compensating value calculating means for calculating the phase compensating value that compensates said voltage phase difference and said current phase difference based on the number of rotations of said brushless DC motor;

an iron loss calculating means for calculating the iron loss of said brushless DC motor;

an effective phase current calculating means for calculating the current value of the effective phase current by subtracting the iron loss component from said phase current of said brushless DC motor based on said iron loss; and an inductance calculating means for calculating the magnetic field axis inductance and the torque axis inductance based on said phase resistance value, said number of rotations, said induced voltage constant, said voltage phase difference, said current phase difference, said phase compensating value, and said effective phase current.

11. A program for detecting the constant of a brushless DC motor which causes a computer to function as a device for calculating the inductance of a brushless DC motor during rotation, wherein said program comprises:

a operating data reading means which reads as operating data the temperature of the stator windings and the temperature of the rotor of said brushless DC motor, the phase angle and the effective value of the phase voltage, the phase angle and effective value of the phase current, the voltage phase difference comprising the difference between the phases of the induced voltage and the phase voltage, the current phase difference comprising the difference between the phases of the induced voltage and the phase current, the number of rotations, the output torque, the winding resistance value of said winding and the wiring resistance value of the connection wiring of said brushless DC motor at a predetermined temperature, the compensating value for said voltage phase difference and said current phase difference that has been set in advance depending on said number of rotations and the mechanical loss that has been set in advance depending on said number of rotations, and the phase angle of the induced voltage constant and the induced voltage that has been set in advance depending on the temperature of said rotor;

a phase resistance value calculating means for calculating the phase resistance value of said brushless DC motor during rotation based on said winding temperature, said winding resistance value, and said wiring resistance value;

a phase difference calculating means for calculating said voltage phase difference and said current phase difference;

a phase difference compensating means for calculating the compensating voltage phase difference and the compensating current phase difference that compensate said current phase difference and said voltage phase difference based on said compensating value;

a motor power calculating means for calculating the motor output power and motor input power of said brushless DC motor based on said output torque and said number of rotations;

a copper loss calculating means for calculating the copper loss based on the effective value of said phase current that includes all frequency components and said phase resistance value;

a total motor loss calculating means for calculating said total motor loss by subtracting said motor output power from said motor input power;

a subtracting means for calculating said iron loss by subtracting said copper loss and said mechanical loss from said total motor loss;

an equivalent resistance value calculating means for calculating the measured iron loss equivalent resistance value based on the effective value of said phase voltage that includes all frequency components and the measured iron loss;

an effective phase current calculating means for calculating the current value of the effective phase current eliminating the iron loss component by subtracting the iron loss component from the effective value of said phase current based on said measured iron loss equivalent resistance value and said compensating current phase difference;

an effective phase difference calculating means for calculating the effective current phase difference eliminating the iron loss component from said compensating current phase difference based on the magnetic field axis current value and the torque axis current value of said effective phase current; and an inductance calculating means for calculating the magnetic field axis inductance and the torque axis inductance based on said phase resistance value, said number of rotations, said inductance voltage constant, said effective phase current, said compensating voltage phase difference, and said effective current phase difference.

* * * * *